US012583432B2

(12) United States Patent
Suzuki et al.

(10) Patent No.: US 12,583,432 B2
(45) Date of Patent: Mar. 24, 2026

(54) VEHICLE

(71) Applicant: TOYOTA JIDOSHA KABUSHIKI KAISHA, Toyota (JP)

(72) Inventors: Ikuma Suzuki, Okazaki (JP); Haruki Oguri, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 43 days.

(21) Appl. No.: 18/596,870

(22) Filed: Mar. 6, 2024

(65) Prior Publication Data

US 2024/0326774 A1    Oct. 3, 2024

(30) Foreign Application Priority Data

Mar. 27, 2023    (JP) ................................. 2023-050328

(51) Int. Cl.
*B60W 10/20*        (2006.01)
*B60W 30/182*      (2020.01)
*B60W 50/08*        (2020.01)
*B60W 50/10*        (2012.01)
*B60W 60/00*        (2020.01)

(52) U.S. Cl.
CPC .......... *B60W 10/20* (2013.01); *B60W 30/182* (2013.01); *B60W 50/082* (2013.01); *B60W 50/10* (2013.01); *B60W 60/0053* (2020.02); *B60W 2510/202* (2013.01); *B60W 2540/18* (2013.01)

(58) Field of Classification Search
CPC ............. B60W 10/20; B60W 60/0053; B60W 30/182; B60W 50/082; B60W 50/10; B60W 2510/202; B60W 2540/18

USPC .......................................................... 701/41
See application file for complete search history.

(56)                References Cited

U.S. PATENT DOCUMENTS 8,994,521 B2 *    3/2015   Gazit ...................... B62D 1/28
                                                              340/425.5
11,654,962 B2 *    5/2023   Saito .................... G06V 20/588
                                                              701/41

(Continued)

FOREIGN PATENT DOCUMENTS

JP          2016-159781 A        9/2016
JP          2018-103670 A        7/2018

(Continued)

*Primary Examiner* — Logan M Kraft
*Assistant Examiner* — John D Bailey
(74) *Attorney, Agent, or Firm* — Oliff PLC

(57)                ABSTRACT

A vehicle includes a vehicle platform configured to receive an instruction from an autonomous driving kit. The vehicle platform includes a steering wheel to be operated by a driver of the vehicle, a steering motor configured to generate torque for varying an angle of a front wheel of the vehicle, and a first control device configured to control the steering motor. The vehicle platform is configured to receive a front wheel steering angle instruction value requested by the autonomous driving kit during autonomous driving of the vehicle. The first control device is configured to classify driver intervention to the steering wheel into one of a plurality of categories, and control torque of the steering motor in consideration of the steering intention of the driver when a driver operation on the steering wheel is caused, during autonomous driving of the vehicle.

8 Claims, 14 Drawing Sheets

< BASE VEHICLE >

DRIVER COORDINATED CONTROL

S161
ESTIMATE STEERING INTENTION OF DRIVER BASED ON DRIVER INTERVENTION DETERMINATION RESULTS

S162
CONTROL MOTOR TORQUE IN CONSIDERATION OF STEERING INTENTION OF DRIVER

RETURN

(56)                    References Cited

U.S. PATENT DOCUMENTS

| | | | |
|---|---|---|---|
| 11,731,695 B2* | 8/2023 | Kojo | B62D 15/025 701/41 |
| 2016/0207537 A1* | 7/2016 | Urano | B60W 50/082 |
| 2016/0209841 A1* | 7/2016 | Yamaoka | B60W 30/00 |
| 2017/0248954 A1* | 8/2017 | Tomatsu | B60W 50/082 |
| 2017/0327110 A1* | 11/2017 | Inoue | B60W 10/20 |
| 2018/0259956 A1* | 9/2018 | Kawamoto | B60W 60/0053 |
| 2018/0284774 A1* | 10/2018 | Kawamoto | B60W 50/0098 |
| 2018/0326992 A1* | 11/2018 | Aoi | B60W 50/08 |
| 2018/0345988 A1* | 12/2018 | Mimura | B60W 50/082 |
| 2018/0348757 A1* | 12/2018 | Mimura | G05D 1/0061 |
| 2019/0286127 A1* | 9/2019 | Watanabe | G05D 1/0061 |
| 2019/0291747 A1 | 9/2019 | Chiba | |
| 2019/0299927 A1* | 10/2019 | Ando | B60K 28/12 |
| 2019/0311207 A1* | 10/2019 | Oniwa | B60W 50/12 |
| 2020/0010111 A1* | 1/2020 | Tsubaki | B62D 5/0463 |
| 2020/0031344 A1* | 1/2020 | Okano | B62D 1/286 |
| 2020/0172122 A1* | 6/2020 | Mimura | B60W 60/0051 |
| 2020/0324792 A1 | 10/2020 | Kunihiro et al. | |
| 2021/0009126 A1* | 1/2021 | Yashiro | B60W 50/082 |
| 2021/0009143 A1* | 1/2021 | Niewiadomski | B60W 50/14 |
| 2021/0146954 A1* | 5/2021 | Kaji | B60W 30/143 |
| 2021/0245806 A1 | 8/2021 | Suzuki et al. | |
| 2022/0212717 A1* | 7/2022 | Saito | G08G 1/167 |
| 2022/0340156 A1* | 10/2022 | Yamamoto | B60W 60/00 |
| 2023/0015466 A1* | 1/2023 | Jiralerspong | G01C 21/3407 |
| 2023/0110521 A1* | 4/2023 | Suzuki | B62D 15/025 701/23 |
| 2023/0110748 A1* | 4/2023 | Suzuki | B60W 40/109 701/41 |
| 2023/0112480 A1* | 4/2023 | Suzuki | B62D 6/002 701/23 |
| 2023/0126269 A1* | 4/2023 | Kim | B62D 15/025 701/23 |
| 2023/0311862 A1* | 10/2023 | Fukuchi | B60W 10/20 701/41 |
| 2024/0067228 A1* | 2/2024 | Kim | B60W 60/0059 |
| 2024/0083466 A1* | 3/2024 | Jang | B60W 60/0053 |
| 2024/0300524 A1* | 9/2024 | Hitakatsu | B60W 50/10 |
| 2024/0326844 A1* | 10/2024 | Oguri | B60W 30/09 |

FOREIGN PATENT DOCUMENTS

| | | |
|---|---|---|
| JP | 2019-177808 A | 10/2019 |
| JP | 2020-172182 | 10/2020 |
| JP | 2021-123146 A | 8/2021 |

* cited by examiner

FIG. 2

STEERING INSTRUCTION
FROM MOTION MANAGER 1

STEERING INSTRUCTION
FROM VCIB 2

122

122A

Steer1

151A

STEERING ECU 1

122B

Steer2

151B

STEERING ECU 2

153

MOTOR SENSOR

ROTATIONAL
ANGLE SENSOR

CURRENT
SENSOR

160

DRIVER STEERING UNIT

161

STEERING WHEEL

162

TORQUE SENSOR

152

STEERING MOTOR

FW

FW

170

STEERING MECHANISM

FIG. 9

| STATUS | VALUE | DESCRIPTION |
|---|---|---|
| HANDLE INTERVENTION BY DRIVER | 0 | MICRO INTERVENTION (NO OR SLIGHT DRIVER OPERATION) |
| | 1 | SOFT INTERVENTION |
| | 2 | HARD INTERVENTION |

VEHICLE

CROSS-REFERENCE TO RELATED APPLICATION

This application claims priority to Japanese Patent Application No. 2023-050328 filed on Mar. 27, 2023 incorporated herein by reference in its entirety.

BACKGROUND

1. Technical Field

The present disclosure relates to a vehicle capable of autonomous driving.

2. Description of Related Art

Japanese Unexamined Patent Application Publication No. 2019-177808 (JP 2019-177808 A) discloses a vehicle with an autonomous driving kit attached to the rooftop of the vehicle. The vehicle includes a built-in control device that controls autonomous driving based on control information from the autonomous driving kit. The autonomous driving kit includes a computer in which autonomous driving control software is installed, a camera, and a sensor.

SUMMARY

The vehicle described in JP 2019-177808 A performs autonomous driving according to instructions from the autonomous driving kit. However, a driver occasionally operates the vehicle during autonomous driving. JP 2019-177808 A does not mention how the vehicle behaves when the driver operates the vehicle during autonomous driving. The convenience of the vehicle may be degraded if the vehicle always ignores operations (e.g. steering wheel operations) from the driver during autonomous driving. On the other hand, the travel stability of the vehicle may be degraded if the vehicle always gives priority to operations from the driver over instructions from the autonomous driving kit when operations are received from the driver during autonomous driving.

The present disclosure provides a vehicle which is capable of autonomous driving and achieves both the convenience and the travel stability.

A first aspect of the present disclosure provides a vehicle including a vehicle platform configured to receive an instruction from an autonomous driving kit. The vehicle platform includes a steering wheel to be operated by a driver of the vehicle, a steering motor configured to generate torque for varying an angle of a front wheel of the vehicle, and a first control device configured to control the steering motor. The vehicle platform is configured to receive a front wheel steering angle instruction value requested by the autonomous driving kit during autonomous driving of the vehicle. The first control device is configured to classify driver intervention to the steering wheel into one of a plurality of categories, and control the torque of the steering motor in consideration of a steering intention of the driver when a driver operation on the steering wheel is caused, during the autonomous driving of the vehicle.

According to the above configuration, it is possible to control torque of the steering motor in consideration of the steering intention of the driver when a driver operation on the steering wheel is caused during autonomous driving of the vehicle. It is easy to achieve both the convenience and the travel stability of the vehicle capable of autonomous driving by allowing steering through coordination between the autonomous driving kit (device) and the driver (human).

In the vehicle according to the first aspect of the present disclosure, the categories may include: a first category in which there is no operation of the steering wheel or a slight operation of the steering wheel; a second category in which an operation of the steering wheel is greater than an operation of the steering wheel in the first category; and a third category in which an operation of the steering wheel is greater than the operation of the steering wheel in the second category.

According to the above configuration, the first control device can easily distinguish the steering intention of the driver based on the first to third categories.

In the vehicle according to the first aspect of the present disclosure, the vehicle platform may further include a torque sensor configured to detect steering torque input from the driver of the vehicle to the steering wheel. The first control device may be configured to classify the driver intervention into one of the categories based on the steering torque.

According to the above configuration, the first control device can easily grasp the steering intention of the driver based on the classification result. For example, it may be highly likely that the steering intention of the driver is straight travel maintenance when the driver intervention is classified into the first category. It may be highly likely that the steering intention of the driver is a lane change when the driver intervention is classified into the second category. It may be highly likely that the steering intention of the driver is obstacle avoidance when the driver intervention is classified into the third category.

In the vehicle according to the first aspect of the present disclosure, the first control device may be configured to estimate the steering intention of the driver based on a result of classifying the driver intervention into one of the categories when the driver operation on the steering wheel is caused during the autonomous driving of the vehicle, and change a control mode for the torque of the steering motor according to the estimated steering intention of the driver.

According to the above configuration, the first control device can easily control torque of the steering motor in a control mode that matches the steering intention of the driver.

In the vehicle according to the first aspect of the present disclosure, the first control device may be configured to execute one of instruction value following control, in which the angle of the front wheel is caused to follow the front wheel steering angle instruction value from the autonomous driving kit, and driver coordinated control, in which the torque of the steering motor is controlled in consideration of the steering intention of the driver, during the autonomous driving of the vehicle. The first control device may be configured to give priority to followability to the front wheel steering angle instruction value over coordination with the driver of the vehicle during execution of the instruction value following control, and give priority to the coordination with the driver of the vehicle over the followability to the front wheel steering angle instruction value, during execution of the driver coordinated control.

According to the above configuration, the vehicle can execute a selected one of a plurality of types of steering control during autonomous driving. During autonomous driving, the vehicle can execute autonomous driving control with high travel stability through the instruction value following control. During autonomous driving, meanwhile, the vehicle can execute autonomous driving control with high convenience by executing the driver coordinated control. In each steering control, moreover, it may be determined in advance which of the followability to the front wheel steering angle instruction value and the coordination with the driver priority is given to. Consequently, it is possible to suppress contention between an instruction from the autonomous driving kit and an instruction from the driver. According to the above configuration, in this manner, it is easy to achieve both the convenience and the travel stability of the vehicle capable of autonomous driving. The driver coordinated control may be performed also when the driver intervention is classified into the first category. In the driver coordinated control, the followability to the front wheel steering angle instruction value may be reduced, since the steering system controls motor torque in coordination with the driver.

In the vehicle according to the first aspect of the present disclosure, the vehicle platform may be configured such that switching between a coordination permitted state and a coordination prohibited state is made according to the instruction from the autonomous driving kit, the coordination permitted state being a state in which coordinated steering with the driver is permitted, the coordination prohibited state being a state in which the coordinated steering with the driver is prohibited.

When the vehicle executes coordinated steering with the driver during autonomous driving, the travel stability of the vehicle may be significantly degraded, depending on the situation. With the above configuration, in this respect, the autonomous driving kit can determine whether coordinated steering with the driver is permitted according to the situation. Therefore, according to the above configuration, it is easy to achieve both the convenience and the travel stability of the vehicle capable of autonomous driving.

The vehicle according to the first aspect of the present disclosure may further include the autonomous driving kit. The categories may include a first category in which there is no operation of the steering wheel or a slight operation of the steering wheel, a second category in which an operation of the steering wheel is greater than an operation of the steering wheel in the first category, and a third category in which an operation of the steering wheel is greater than that the operation of the steering wheel in the second category. The vehicle platform may be configured to transmit a result of classifying the driver intervention to the autonomous driving kit. The autonomous driving kit may include a second control device configured to determine a command related to autonomous driving control using the result of classifying the driver intervention.

According to the above configuration, the autonomous driving kit can easily execute autonomous driving control in consideration of driver intervention.

In the vehicle according to the first aspect of the present disclosure, the command related to the autonomous driving control may include a coordinated steering command that provides an instruction as to which of a coordination permitted state and a coordination prohibited state the vehicle platform is brought into, the coordination permitted state being a state in which coordinated steering with the driver is permitted, the coordination prohibited state being a state in which the coordinated steering with the driver is prohibited. The second control device may be configured to determine whether the vehicle platform is brought into the coordination prohibited state when the vehicle platform is in the coordination permitted state and the driver intervention is classified into the first category. The second control device may be configured to determine whether the vehicle platform is brought into the coordination permitted state when the vehicle platform is in the coordination prohibited state and the driver intervention is classified into the second category.

When the driver intervention is classified into the second category, it may be highly likely that preparation for driving by the driver has been completed. When the driver intervention is classified into the first category, there may be a possibility that the driver has no intention to intervene in steering (intention to drive). According to the above configuration, the autonomous driving kit can easily make switching between the coordination permitted state and the coordination prohibited state properly.

In the vehicle according to the first aspect of the present disclosure, the command related to the autonomous driving control may include a vehicle mode command that requests switching between an autonomous mode, in which the vehicle platform is under control by the autonomous driving kit, and a manual mode, in which the vehicle is under control by the driver. The second control device may be configured to determine whether switching is made from the autonomous mode to the manual mode when the driver intervention is classified into the third category in the autonomous mode.

When the driver intervention is classified into the third category, there may be a possibility that the driver desires to drive manually. According to the above configuration, the autonomous driving kit can easily make switching between the autonomous mode and the manual mode properly.

In the vehicle according to the first aspect of the present disclosure, the vehicle platform may include a base vehicle that includes the steering wheel, the steering motor, and the first control device, and a vehicle control interface box that includes a third control device configured to communicate with both the first control device and the second control device. The first control device may be configured to transmit vehicle information about the base vehicle to the third control device. An application program interface signal defined by an application program interface may be used for communication between the second control device and the third control device. The application program interface signal may include an application program interface command that indicates an instruction for the base vehicle and an application program interface status that indicates a state of the base vehicle. The third control device may be configured to convert the application program interface command from the second control device into a signal that is executable by the first control device, and transmit the converted signal to the first control device. The third control device may be configured to acquire the application program interface status using the vehicle information from the first control device, and transmit the acquired application program interface status to the second control device.

According to the above configuration, it is possible to use signals of different types on the base vehicle side and the autonomous driving kit side of the vehicle control interface box. It is only necessary that a developer of the autonomous driving kit should consider a signal (application program interface signal) on the autonomous driving kit side. Therefore, development of the autonomous driving kit is promoted. Software of the developed autonomous driving kit may be consecutively updated over the air (OTA).

According to a certain embodiment, a program that causes a vehicle to execute the control described above may be provided. According to another embodiment, a control device that includes a storage device that stores the above program and a processor that executes the program may be provided. According to still another embodiment, a computer device that distributes the above program may be provided.

According to the present disclosure, it is possible to achieve both the convenience and the travel stability of a vehicle capable of autonomous driving.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 2 illustrates the details of a control system for the vehicle illustrated in FIG. 1;

FIG. 9 is a flowchart illustrating an example of autonomous driving control executed according to instructions from the autonomous driving kit by the first control device included in the base vehicle illustrated in FIG. 2;

DETAILED DESCRIPTION OF EMBODIMENTS

An embodiment of the present disclosure will be described in detail below with reference to the drawings.

The same or corresponding portions are denoted by the same signs throughout the drawings, and description thereof will not be repeated.

Figure 1:
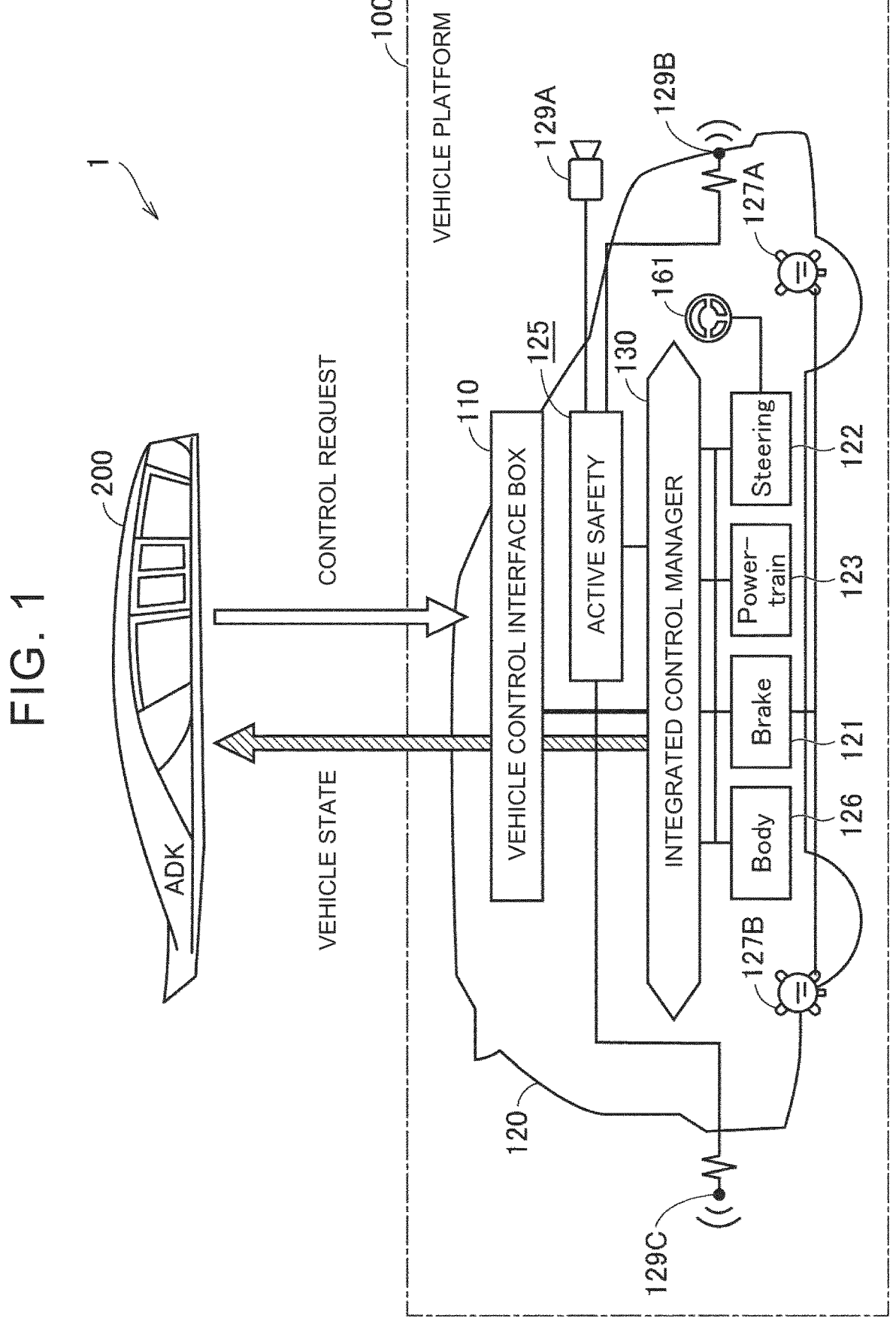
FIG. 1 illustrates a schematic configuration of a vehicle according to an embodiment of the present disclosure.

FIG. 1 illustrates a schematic configuration of a vehicle according to an embodiment of the present disclosure. With reference to FIG. 1, a vehicle 1 includes a vehicle platform (hereinafter referred to as "VP") 100 and an autonomous driving kit (hereinafter referred to as "ADK") 200. The VP 100 includes a vehicle control interface box (hereinafter "VCIB") 110 and a base vehicle 120. A VP 100 with a removable ADK 200 is formed by adding the VCIB 110 to the base vehicle 120. Then, a vehicle 1 is completed by attaching the ADK 200 to the VP 100. While the base vehicle 120 and the ADK 200 are positioned away from each other in the illustration in FIG. 1, the ADK 200 is attached to the base vehicle 120 in reality. In this embodiment, the ADK 200 is attached to the rooftop of the base vehicle 120. However, the position of attachment of the ADK 200 is changeable as appropriate.

The base vehicle 120 is an electrified vehicle that is available in the market, for example. The base vehicle 120 includes a steering wheel 161. In this embodiment, a battery electric vehicle (BEV) is employed as the base vehicle 120. However, this is not limiting, and the base vehicle 120 may be an electrified vehicle other than the BEV (such as a hybrid electric vehicle (HEV), a plug-in hybrid electric vehicle (PHEV), and a fuel cell electric vehicle (FCEV)). The base vehicle 120 includes four wheels, for example. However, this is not limiting, and the base vehicle 120 may include three or five or more wheels.

The VCIB 110 is configured to communicate with both the base vehicle 120 and the ADK 200 via a communication bus. The physical communication among these may be communication that uses a controller area network (CAN).

The base vehicle 120 includes an integrated control manager 130, and various systems and various sensors for controlling the base vehicle 120. The integrated control manager 130 functions as a control device. The integrated control manager 130 may include a built-in computer that includes a processor and a storage device. The integrated control manager 130 integrally controls the various systems related to operation of the base vehicle 120 based on signals (sensor detection signals) from the various sensors included in the base vehicle 120.

The base vehicle 120 includes wheel speed sensors 127A and 127B. The wheel speed sensor 127A is provided at a front wheel of the base vehicle 120 to detect the rotational speed of the front wheel. The wheel speed sensor 127B is provided at a rear wheel of the base vehicle 120 to detect the rotational speed of the rear wheel. An electronic control unit (ECU) of a brake system 121 outputs the rotational direction and the rotational speed of each wheel detected by the wheel speed sensors 127A and 127B to the integrated control manager 130. The integrated control manager 130 may calculate the travel speed (vehicle speed) of the vehicle 1 based on detection signals of the wheel speed sensors 127A and 127B.

The base vehicle 120 includes the brake system 121, a steering system 122, a power train system 123, an active safety system 125, and a body system 126. These systems are integrally controlled by the integrated control manager 130. In this embodiment, each system includes a control device. The control device of each system may include a built-in computer that includes a processor and a storage device. The control device of each system communicates with the integrated control manager 130 through an in-vehicle network (e.g. CAN). In the following, the control device included in each system will be referred to as "electronic control unit (ECU)".

For example, the active safety system 125 includes an ECU that determines the possibility of a collision of the vehicle 1 during travel. The base vehicle 120 includes a camera 129A and radar sensors 129B and 129C that detect surrounding circumstances including forward and rearward areas of the vehicle 1. The ECU of the active safety system 125 determines whether there is a possibility of a collision using signals received from the camera 129A and the radar sensors 129B and 129C. When the active safety system 125 determines that there is a possibility of a collision, the integrated control manager 130 outputs a braking command to the brake system 121 to increase the braking force of the vehicle 1. The base vehicle 120 according to this embodiment includes the active safety system 125 in the initial state (at the time of shipping). However, this is not limiting, an active safety system that is retrofittable to the base vehicle may also be employed.

The body system 126 includes body components (e.g. blinkers, a horn, and wipers) and an ECU that controls the body components. The ECU of the body system 126 controls the body components according to user operations in a manual mode, and controls the body components according to instructions from the ADK 200 in an autonomous mode.

The vehicle 1 is configured to be autonomously driven by the brake system 121, the steering system 122, and the power train system 123 to be discussed in detail later (see FIG. 2). The VCIB 110 functions as a vehicle control interface. When the vehicle 1 travels through autonomous driving, the base vehicle 120 and the ADK 200 exchange signals via the VCIB 110, and the base vehicle 120 executes travel control (i.e. autonomous driving control) in the autonomous mode according to instructions from the ADK 200. However, the base vehicle 120 can travel alone by being driven by a driver (user) even with the ADK 200 removed. When the base vehicle 120 travels alone, the base vehicle 120 executes travel control (i.e. travel control according to driver operations) in the manual mode. Switching may be made between the autonomous mode and the manual mode according to an instruction from a vehicle manager or an external server.

The vehicle 1 discussed above may be used for mobility as a service (MaaS). The service may be provided by a MaaS system that includes a mobility service platform (MSPF). The MSPF is a unified platform connected to various mobility services (e.g. various mobility services provided by ride-sharing business operators, car-sharing business operators, insurance companies, car-rental business operators, taxi business operators, etc.). The MaaS system may further include a management server that manages and publishes information for the mobility services. The management server may manage information on various mobilities and provide information (e.g. an application program interface (API) and information about coordination among the mobilities) according to requests from business operators. The business operators that provide services can use various functions provided by the MSPF using the API published on the MSPF. For example, an API that is required to develop an ADK is published on the MSPF. The management server and terminals of the business operators may share a database using blockchain.

Figure 2:
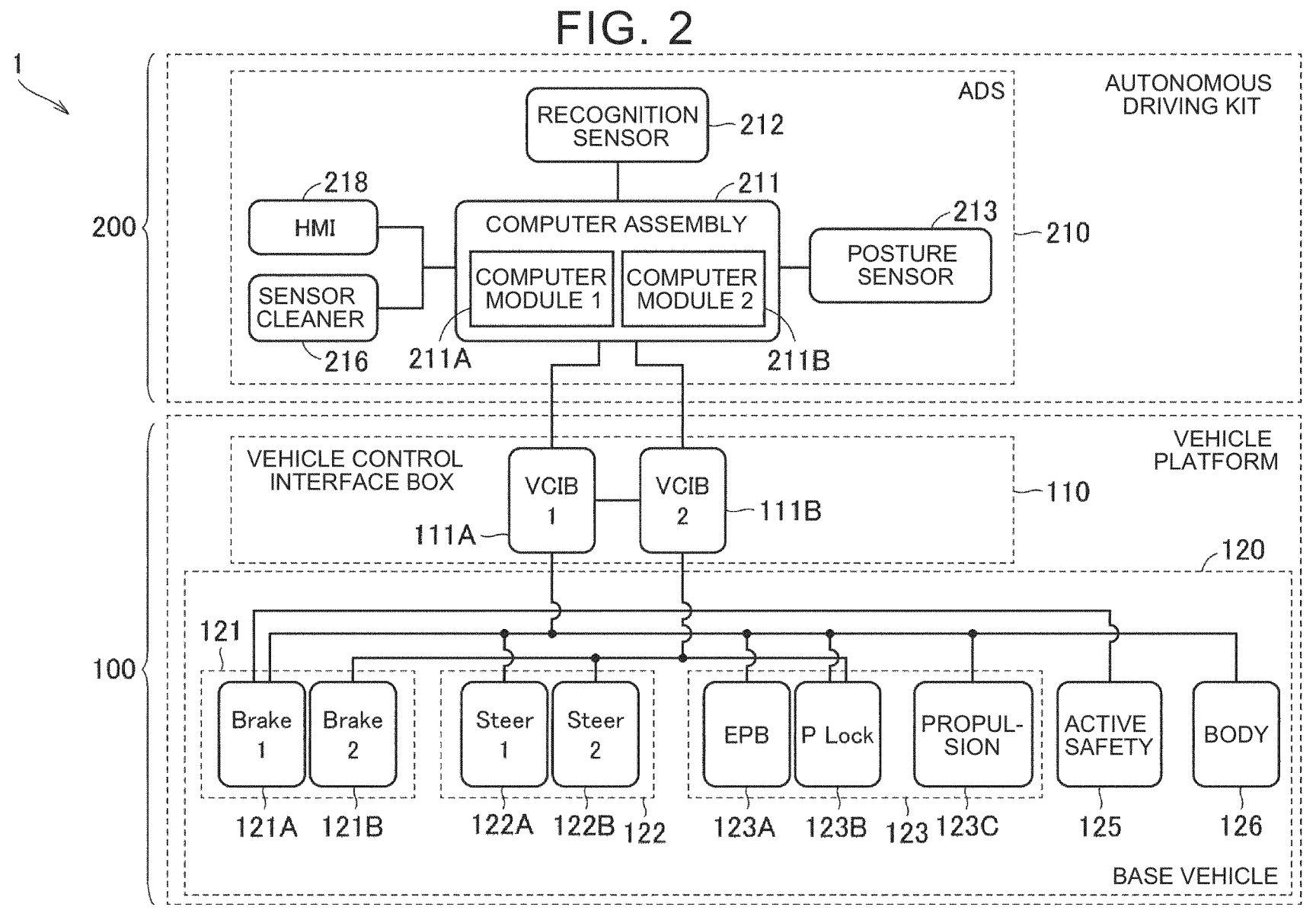

FIG. 2 illustrates the details of a control system for the vehicle 1. With reference to FIG. 2 together with FIG. 1, the ADK 200 includes an autonomous driving system (hereinafter referred to as "ADS") 210 for performing autonomous driving of the vehicle 1. The ADS 210 includes a computer assembly (hereinafter referred to as "ADSCOM") 211, a recognition sensor 212, a posture sensor 213, a sensor cleaner 216, and a human machine interface (HMI) 218.

The ADSCOM 211 includes a first computer module (hereinafter referred to as "first ADC") 211A and a second computer module (hereinafter referred to as "second ADC") 211B. Each of the first ADC 211A and the second ADC 211B includes a processor and a storage device that stores autonomous driving software that uses the API, and is configured to be able to execute the autonomous driving software using the processor. Control related to autonomous driving is executed by the autonomous driving software. The autonomous driving software may be consecutively updated over the air (OTA). The first ADC 211A corresponds to a main control unit of the ADK 200, and the second ADC 211B corresponds to a sub control unit of the ADK 200. In the following, the first ADC 211A and the second ADC 211B are occasionally referred to as "ADK-1" and "ADK-2", respectively.

The recognition sensor 212 includes a sensor that acquires information (hereinafter also referred to as "environmental information") that indicates an external environment of the vehicle 1. The recognition sensor 212 acquires environmental information for the vehicle 1, and outputs the environmental information to the ADSCOM 211. In this embodiment, the recognition sensor 212 includes a camera that captures an image of the surroundings (including forward and rearward areas) of the vehicle 1, and an obstacle detector (e.g. a millimeter wave radar and/or a lidar) that detects obstacles using electromagnetic waves or acoustic waves. The ADSCOM 211 can recognize the external environment of the vehicle 1 using the environmental information received from the recognition sensor 212. For example, the ADSCOM 211 can recognize people, objects (such as other vehicles, poles, and guardrails), and lines (e.g. center lines) on roads. An artificial intelligence (AI) or a processor for image processing may be used for recognition. The ADSCOM 211 uses the environmental information for autonomous driving control.

The posture sensor 213 acquires information (hereinafter also referred to as "posture information") about the posture of the vehicle 1, and outputs the posture information to the ADSCOM 211. The posture sensor 213 includes various sensors that detect the acceleration, the angular speed, and the position of the vehicle 1. In this embodiment, the posture sensor 213 includes inertial measurement unit (IMU) and a position measurement sensor. The IMU detects the acceleration in each of the front-rear direction, the right-left direction, and the up-down direction of the vehicle 1, and the angular speed in each of the roll direction, the pitch direction, and the yaw direction of the vehicle 1. The position measurement sensor detects the position of the vehicle 1 using a position measurement system such as a global positioning system (GPS), for example. The ADSCOM 211 uses the posture information for autonomous driving control.

The sensor cleaner 216 is a device that removes dirt from a sensor (e.g. the recognition sensor 212) exposed to air outside the vehicle. For example, the sensor cleaner 216 may be configured to clean a lens of the camera and an emission port of the obstacle detector using a cleaning solution and a wiper.

The HMI 218 is a device that allows the user and the ADSCOM 211 to exchange information. The HMI 218 includes an input device and an indication device. The user can send an instruction or a request to the ADSCOM 211 or change the values of parameters (only those for which such changes are permitted) that are used for the autonomous driving software through the HMI 218. The HMI 218 may be a touch panel display that functions as both the input device and the indication device.

In the vehicle 1, the control system related to the behavior (run, stop, and steer) of the vehicle 1 is redundant. The first ADC 211A and the second ADC 211B provide instructions to a main control system and a sub control system, respectively. Appropriate control is executed as one of the plurality of control systems operates normally, even if an abnormality is caused in the other control system. In this embodiment, the control system on the VP 100 side is also redundant. However, the function to accelerate the vehicle 1 is not rendered redundant.

The brake system 121 includes brake control units 121A and 121B. The steering system 122 includes steering control units 122A and 122B. The power train system 123 includes an electric parking brake (EPB) control unit 123A, a parking lock (P-lock) control unit 123B, and a propulsion control unit 123C. Each of these control units includes an ECU. The VCIB 110 includes a first control unit (hereinafter referred to as "first VCIB") 111A and a second control unit (hereinafter referred to as "second VCIB") 111B. Each of these control units may include a computer that includes a processor and a storage device. The first VCIB 111A corresponds to a main control unit of the VCIB 110, and the second VCIB 111B corresponds to a sub control unit of the VCIB 110. The first VCIB 111A and the second VCIB 111B are configured to be able to communicate with the first ADC 211A and the second ADC 211B, respectively. The first VCIB 111A is configured to be able to communicate with each of the brake control unit 121A, the steering control unit 122A, the EPB control unit 123A, the P-lock control unit 123B, the propulsion control unit 123C, and the body system 126. The first VCIB 111A may communicate with each of these systems directly, or may communicate with each system via the integrated control manager 130 illustrated in FIG. 1. The second VCIB 111B is configured to be able to communicate with each of the brake control unit 121B, the steering control unit 122B, and the P-lock control unit 123B. The second VCIB 111B may communicate with each of these systems directly, or may communicate with each system via the integrated control manager 130 illustrated in FIG. 1. In the following, the first VCIB 111A and the second VCIB 111B are occasionally referred to as "VCIB-1" and "VCIB-2", respectively.

The brake system 121 includes a braking device and the brake control units 121A and 121B. The braking device includes a braking member that applies a braking force to a wheel and an actuator that drives the braking member. Examples of the braking device include a hydraulic disc brake device. Each of the brake control units includes an ECU that controls the braking device. The braking device further includes an operation portion (e.g. a brake pedal) that receives a brake operation from the driver. In the manual mode, the ECU controls the braking device according to a driver operation. Each of the brake control units further includes a motion manager to be discussed later (see FIG. 3).

The steering system 122 includes a steering device and the steering control units 122A and 122B. Each of the steering control units includes an ECU that controls the steering device. The steering device includes an operation portion (the steering wheel 161 illustrated in FIG. 1 in this embodiment) that receives a steering operation from the driver. In the manual mode, the ECU controls the steering device according to a driver operation. The configuration of the steering device will be discussed in detail later (see FIGS. 4 to 6).

The power train system 123 includes a shift device, a vehicle control device, an EPB device, a P-lock device, the EPB control unit 123A, the P-lock control unit 123B, and the propulsion control unit 123C.

The shift device is configured to determine a shift range and switch the propulsion direction and the shift mode of the base vehicle 120 according to the determined shift range. The shift device includes various gears (speed change mechanism) to be switched according to the shift range. The shift device further includes an operation portion (e.g. a shift lever) that receives a shift operation from the driver in addition to the speed change mechanism. In the manual mode, the shift range is switched according to a driver operation.

The vehicle drive device is configured to apply a propulsion force in the propulsion direction indicated by the shift range. The vehicle drive device includes a battery and a travel motor that receives supply of power from the battery. The travel motor rotates drive wheels of the base vehicle 120 using power from the battery. The vehicle drive device further includes an operation portion (e.g. an accelerator pedal) that receives an accelerator operation from the driver.

The EPB device is configured to bring the wheels into a locked state by applying a braking force to the wheels using an electric actuator (motor). The EPB device is provided in a transmission of the base vehicle 120 separately from the braking device discussed earlier. The EPB device further includes an operation portion (e.g. an EPB switch) that receives an EPB request from the driver in addition to a brake mechanism and the electric actuator.

The P-lock device is configured to mechanically lock the rotational position of an output shaft of the transmission using a parking lock pawl that can be driven by an actuator, for example. The P-lock device may fit the parking lock pawl with a gear (lock gear) coupled to a rotary element in the transmission. The P-lock device may further include an operation portion (e.g. a parking brake lever) that receives a parking operation from the driver in addition to a parking lock mechanism and the actuator.

The EPB control unit 123A includes an ECU that controls the EPB device and the shift device. The P-lock control unit 123B includes an ECU that controls the P-lock device and the shift device. The propulsion control unit 123C includes an ECU that controls the vehicle drive device and the shift device. In the manual mode, these ECUs control the vehicle drive device, the shift device, the EPB device, and the P-lock device according to a driver operation.

Figure 3:
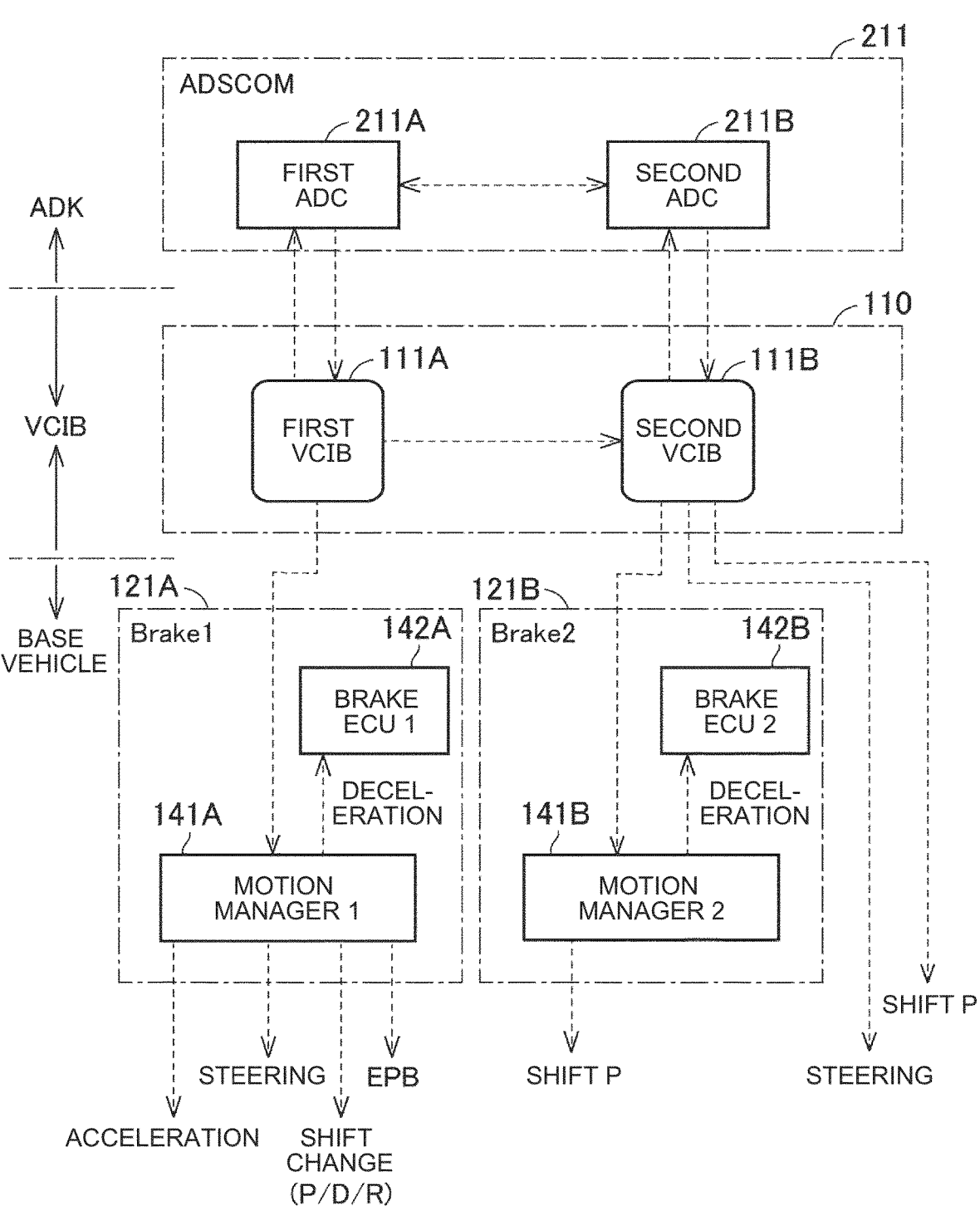
FIG. 3 illustrates the functions of a first control device included in a base vehicle, a second control device included in an autonomous driving kit, and a third control device included in a vehicle control interface box in the control system illustrates in FIG. 2.

FIG. 3 illustrates the function of the various control devices included in the VCIB 110, the base vehicle 120, and the ADK 200. With reference to FIG. 3 together with FIGS. 1 and 2, the brake control units 121A and 121B include motion managers 141A and 141B and brake ECUs 142A and 142B, respectively. These function as control devices. The first VCIB 111A is configured to be able to communicate with both the first ADC 211A and the motion manager 141A. The second VCIB 111B is configured to be able to communicate with both the second ADC 211B and the motion manager 141B. In addition, the second VCIB 111B is configured to directly communicate with an ECU of the P-lock control unit 123B illustrated in FIG. 2 and a steering ECU 151B to be discussed later (see FIG. 4).

In this embodiment, the various control devices included in the base vehicle 120 function independently or in cooperation as a "first control device" according to the present disclosure. The first ADC 211A and the second ADC 211B function independently or in cooperation as a "second control device" according to the present disclosure. The first VCIB 111A and the second VCIB 111B function independently or in cooperation as a "third control device" according to the present disclosure.

The first ADC 211A, the first VCIB 111A, and the motion manager 141A constitute the main control system. The first VCIB 111A requests the motion manager 141A for autonomous driving control according to instructions from the first ADC 211A. The motion manager 141A requests control (e.g. acceleration control, deceleration control, steering control, shift control, or EPB control) necessary to implement the requested autonomous driving control from a system corresponding to the control (see FIG. 9 for details).

The second ADC 211B, the second VCIB 111B, and the motion manager 141B constitute the sub control system. Autonomous driving control for stopping the vehicle and immobilization is executed by the sub control system when an abnormality is caused in the main control system. The second ADC 211B requests the second VCIB 111B for autonomous driving control for stopping the vehicle and immobilization. The second VCIB 111B requests the steering control unit 122B for steering control when steering control for stopping the vehicle is requested by the second ADC 211B, and requests the P-lock control unit 123B for control for immobilization when immobilization is requested by the second ADC 211B. Meanwhile, the second VCIB 111B requests the motion manager 141B for deceleration control when deceleration control for stopping the vehicle is requested by the second ADC 211B. The motion manager 141B causes the brake ECU 142B to execute the requested deceleration control. The motion manager 141B stops the vehicle 1 by causing the brake ECU 142B to control the braking device (brake system 121), and thereafter executes immobilization (parking lock) using the P-lock control unit 123B.

In this embodiment, signals (API signals) defined by the application program interface (API) are used for communication between the ADK 200 and the VCIB 110. The ADK 200 is configured to process various signals defined by the API. The ADK 200 prepares a travel plan for the vehicle 1, and outputs various commands for causing the vehicle 1 to travel according to the prepared travel plan to the VCIB 110 according to the API. In the following, each of the various commands output from the ADK 200 to the VCIB 110 will also be referred to as "application program interface command (API command)". In addition, the ADK 200 receives various signals that indicate the state of the base vehicle 120 from the VCIB 110 according to the API, and prepares a travel plan in consideration of the received state of the base vehicle 120. In the following, each of the various signals received by the ADK 200 from the VCIB 110 will also be referred to as "application program interface statuses (API statuses)". Both the API command and the API status correspond to the API signals.

In this embodiment, the ADK 200 uses API commands to be described below in order to control the vehicle 1.

A vehicle mode command is an API command to request a transition to the autonomous mode or the manual mode. The vehicle mode command is set to one of a value "0" that indicates no request, a value "1" that requests a transition to the autonomous mode, and a value "2" that requests a transition (deactivation) to the manual mode. The autonomous mode and the manual mode will be discussed later.

A propulsion direction command is an API command to request switching of the shift range (R/D). The propulsion direction command is set to one of a value "0" that indicates no request, a value "2" that requests a change to an R (reverse) range, and a value "4" that requests a change to a D (drive) range.

An acceleration command is an API command that provides an instruction for acceleration of the vehicle. The acceleration command indicates a positive value when requesting acceleration with respect to a direction indicated by a propulsion direction status to be discussed later, and indicates a negative value when requesting deceleration. The acceleration command requests acceleration (+) and deceleration (−) with respect to the direction indicated by propulsion direction status.

A front wheel steering angle command is an API command that requests steering of the front wheels of the vehicle. The front wheel steering angle command indicates a positive steering angle value when requesting left steering, and indicates a negative steering angle value when requesting right steering. The front wheel steering angle command requests a steering angle value in a range that does not exceed a limit value of the front wheel steering angular speed to be discussed later.

An immobilization command is an API command that requests application or release of immobilization. The immobilization command is set to one of a value "0" that indicates no requests, a value "1" that requests application of immobilization, and a value "2" that requests release of immobilization. Application of immobilization means turning on (actuating) the EPB and switching the shift range to P (parking).

A coordinated steering command is an API command for coordinated steering with the driver. The coordinated steering command is set to one of a value "0" that permits coordinated steering with the driver and a value "1" that prohibits coordinated steering with the driver.

Some of the API commands that are used in the vehicle 1 have been described above. The VCIB 110 receives various API commands from the ADK 200. When API commands are received from the ADK 200, the VCIB 110 converts the API commands into a signal format that can be processed by the control devices of the base vehicle 120. Hereinafter, the API commands converted into the signal format that can be processed by the control devices of the base vehicle 120 will also be referred to as "internal instructions". When API commands are received from the ADK 200, the VCIB 110 outputs internal instructions corresponding to the API commands to the base vehicle 120.

In addition, the ADK 200 grasps the state of the base vehicle 120 using the API statuses to be described below, for example.

A vehicle mode status is an API status that indicates the state of the vehicle mode. The vehicle mode includes a manual mode, an autonomous mode, and a standby mode. The manual mode is a vehicle mode in which the vehicle is under control by the driver (human). The autonomous mode is a vehicle mode in which the vehicle platform (including the base vehicle) is under control by the autonomous driving kit. The standby mode is a vehicle mode in which movement of the vehicle is prohibited. In the initial state, the vehicle mode is the manual mode. That is, the vehicle mode starts at the manual mode. The vehicle mode status outputs a corresponding value "0", "1", or "2" when the present vehicle mode is the manual mode, the autonomous mode, or the standby mode.

A propulsion direction status is an API status that indicates the present shift range. The propulsion direction status outputs a corresponding value "1", "2", "3", or "4" when the present shift range is P (parking), R (reverse), N (neutral), or D (drive). When the present shift range is undefined, meanwhile, the propulsion direction status outputs a value "7" (invalid value).

A traveling direction status is an API status that indicates the traveling direction of the vehicle. The traveling direction status outputs a value "0" when the vehicle is traveling forward, and outputs a value "1" when the vehicle is traveling backward. The traveling direction status outputs a value "2" that indicates a standstill when all the wheels (four wheels) indicate a speed "0" for a certain time.

A vehicle speed status is an API status that indicates the speed in the longitudinal direction of the vehicle. The vehicle speed status outputs an absolute value of the vehicle speed. That is, the vehicle speed status outputs a positive value also when the vehicle is traveling backward.

A front wheel steering angle status is an API status that indicates a front wheel steering angle value (front wheel tire turning angle). The front wheel steering angle status indicates a left steering angle with a positive value, and indicates a right steering angle with a negative value.

A front wheel steering angular speed status is an API status that indicates a front wheel steering angular speed (angular speed of front wheel tire turning angle). The front wheel steering angular speed status indicates a left angular speed with a positive value, and indicates a right angular speed with a negative value.

A front wheel steering angular speed limit value is an API status that indicates a limit value of the front wheel angular speed (angular speed of front wheel tire turning angle). The front wheel steering angular speed limit value has a value that matches the vehicle speed. The front wheel steering angular speed limit value is determined according to a map that indicates the relationship between the limit value and the vehicle speed. However, the front wheel steering angular speed limit value may also be varied according to a condition other than the vehicle speed.

A handle angle status is an API status that indicates the steering angle of the steering wheel (handle). The handle angle status indicates a steering angle obtained by converting the rotational angle of a steering motor (assist motor) into the angle of a handle shaft. The handle angle status indicates left steering with a positive steering angle value, and indicates right steering with a negative steering angle value.

A handle angular speed status is an API status that indicates the steering angular speed of the steering wheel (handle). The handle angular speed status indicates a steering angular speed obtained by converting the rotational angular speed of the steering motor (assist motor) into the angular speed of the handle shaft. The handle angular speed status indicates a left steering angular speed with a positive value, and indicates a right steering angular speed with a negative value.

An immobilization status is an API status that indicates the state of immobilization (e.g. EPB and shift P state).

A coordinated steering status is an API status that indicates the state of coordinated operation between the steering system and the driver. The coordinated steering status outputs a value "0" when coordinated steering with the driver is permitted, and outputs a value "1" when coordinated steering with the driver is prohibited.

A driver intervention status is an API status that indicates the state of handle intervention by the driver. The driver intervention status will be discussed in detail later (see FIG. 10).

Some of the API statuses that are used in the vehicle 1 have been described above. The VCIB 110 receives various sensor detection values and state determination results from the base vehicle 120, and outputs various API statuses that indicate the state of the base vehicle 120 to the ADK 200. The VCIB 110 acquires API statuses for which values that indicate the state of the base vehicle 120 have been set, and outputs the obtained API statuses to the ADK 200. The VCIB 110 may determine the values of the API statuses based on sensor detection values received from the base vehicle 120, or may convert sensor signals received from the base vehicle 120 into the format of the API statuses.

Figure 4:
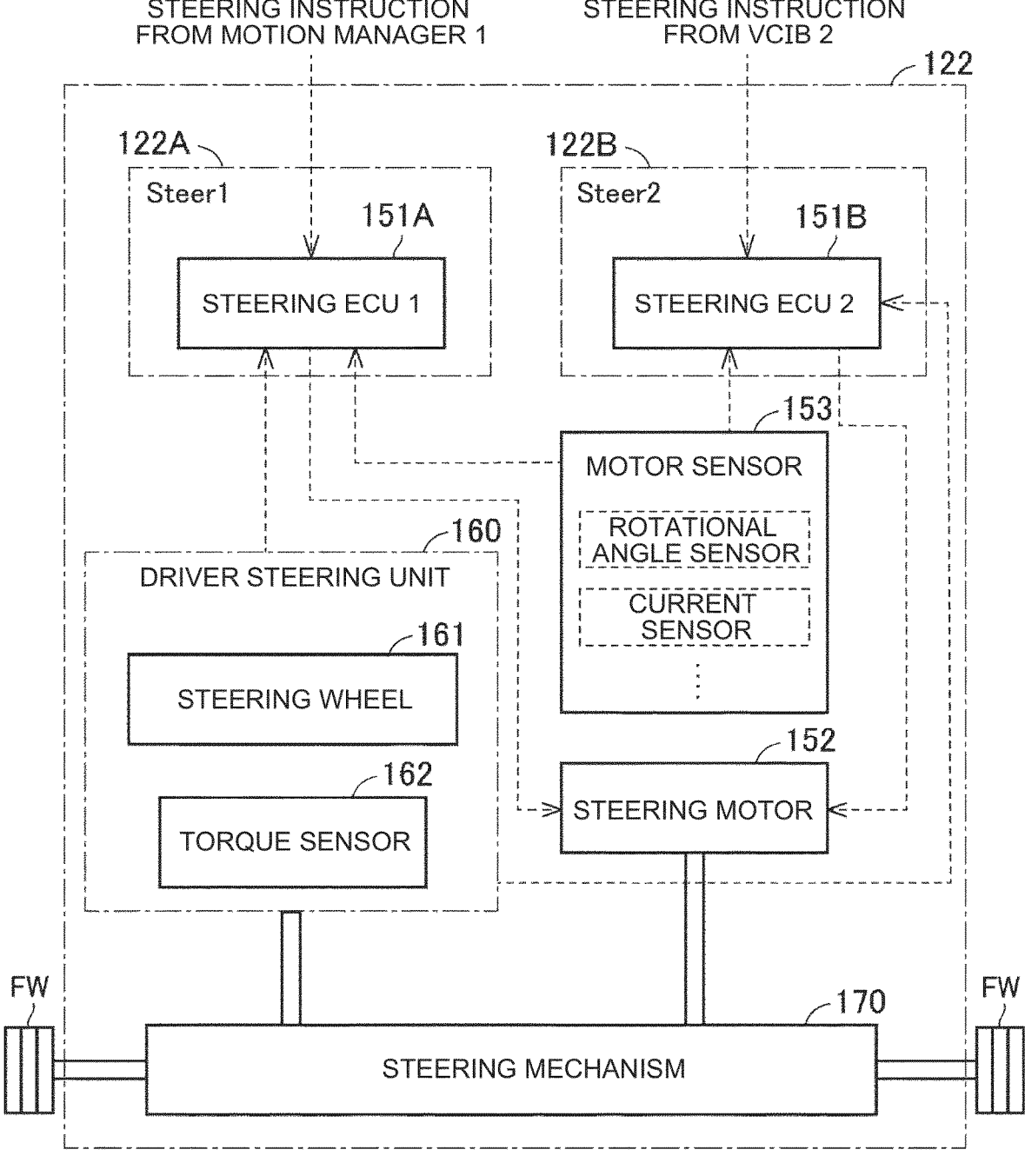
FIG. 4 illustrates the configuration of a steering system illustrated in FIG. 2.

FIG. 4 illustrates the configuration of the steering system 122 for steering front wheels FW of the vehicle 1. With reference to FIG. 4, the steering system 122 includes the steering control units 122A and 122B, a steering motor 152 (hereinafter occasionally referred to simply as "motor 152"), a motor sensor 153, a driver steering unit 160, and a steering mechanism 170. The steering control units 122A and 122B include steering ECUs 151A and 151B, respectively. Each of the steering ECUs 151A and 151B is configured to control the motor 152. Specifically, each of the steering ECUs 151A and 151B includes a computer that includes a processor and a storage device, and a drive circuit (e.g. an inverter) that drives the motor 152 according to instructions from the computer.

The steering ECU 151A controls the motor 152 according to a front wheel steering angle instruction value from the first ADC 211A (FIG. 3). Specifically, when the first ADC 211A executes steering control, the first VCIB 111A converts a front wheel steering angle command from the first ADC 211A into an internal instruction value. Then, the internal instruction value corresponding to the front wheel steering angle command is transmitted from the first VCIB 111A to the steering ECU 151A by way of the motion manager 141A. The steering ECU 151A controls the motor 152 according to the transmitted steering angle instruction value.

The steering ECU 151B controls the motor 152 according to a front wheel steering angle instruction value from the second ADC 211B (FIG. 3). Specifically, when the second ADC 211B executes steering control, the second VCIB 111B converts a front wheel steering angle command from the second ADC 211B into an internal instruction value, and transmits the internal instruction value corresponding to the front wheel steering angle command to the steering ECU 151B. The steering ECU 151B controls the motor 152 according to the transmitted steering angle instruction value.

The motor 152 generates torque for varying the angle of the front wheels FW. The motor 152 may be a three-phase motor to be controlled according to a pulse width modulation (PWM) signal. The motor sensor 153 includes various sensors (e.g. a rotational angle sensor and a current sensor) that detect the state of the motor 152. The motor sensor 153 outputs the detection results (sensor detection values) to each of the steering ECUs 151A and 151B. The steering ECUs acquire a motor angle (rotational angle of the motor 152) and a motor current (the direction and the magnitude of a current for the motor 152) based on the sensor detection values. The steering ECUs may control motor torque (the direction and the magnitude of torque output from the motor 152) based on the motor current. The steering ECUs may control the motor 152 such that a motor current that matches target motor torque flows through the motor 152. However, the motor sensor 153 may include a torque sensor that directly detects motor torque.

The driver steering unit 160 includes the steering wheel 161 and a torque sensor 162. The steering wheel 161 is operated by the driver of the vehicle 1. The torque sensor 162 detects steering torque (torque input from the driver of the vehicle 1 to the steering wheel 161) for the steering wheel 161. The torque sensor 162 may further detect a road surface reaction force. The steering wheel is a member to be operated by the driver for steering, and is also referred to as "handle". The steering wheel 161 may be provided with a handle steering angle sensor that detects a steering angle.

The steering mechanism 170 is mechanically connected to each of the driver steering unit 160 and the motor 152. The steering mechanism 170 is also mechanically connected to the front wheels FW of the vehicle 1. Each of the steering torque input from the driver of the vehicle 1 to the steering wheel 161 and the motor torque output from the motor 152 is converted into a force that varies the angle of the front wheels FW by the steering mechanism 170. The motor 152 supplements steering torque for the steering wheel 161, or independently varies the angle of the front wheels FW. The steering mechanism 170 may employ a mechanism (such as a column assist type, a pinion assist type, and a rack assist type) employed in known electric power steering (EPS) systems. The steering mechanism 170 may include a speed reduction mechanism.

Figure 5:
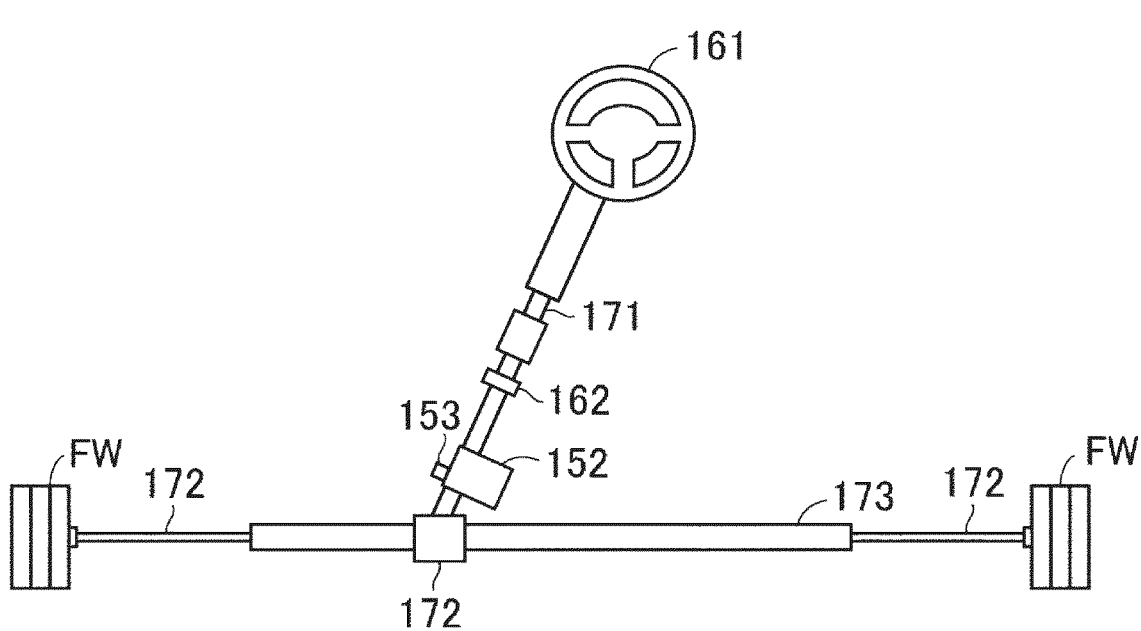
FIG. 5 illustrates a first example of the structure of a steering mechanism illustrated in FIG. 4.

FIG. 5 illustrates a first example of the structure of the steering mechanism 170. With reference to FIG. 5, the steering mechanism 170 includes a steering shaft 171 (hereinafter occasionally referred to simply as "shaft 171"), tie rods 172, and a gear box 173. The steering shaft 171 is a shaft connected to the steering wheel 161. The tie rods 172 are arms that connect between the front wheels FW and the gear box 173. The gear box 173 includes a rack and pinion mechanism that mechanically connects the shaft 171 and the tie rods 172, for example. Steering torque input to the steering wheel 161 is transferred to the gear box 173 by the shaft 171. Motor torque output from the motor 152 is also transferred to the gear box 173 by the shaft 171. The steering wheel 161 and the motor 152 may operate in conjunction with each other via the shaft 171. The gear box 173 converts rotation of the shaft 171 into right-left movement of the tie rods 172. Consequently, the angle (front wheel tire turning angle) of the front wheels FW is varied.

Figure 6:
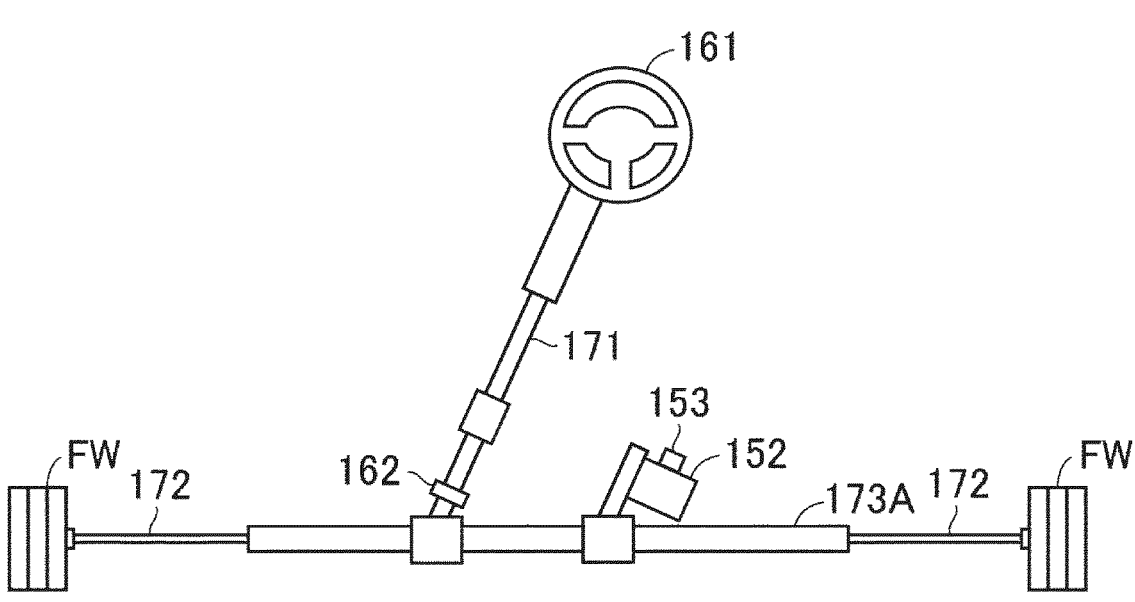
FIG. 6 illustrates a second example of the structure of the steering mechanism illustrated in FIG. 4.

In the example illustrated in FIG. 5, the motor 152 is disposed so as to rotate the shaft 171. However, the position of the motor 152 is changeable as appropriate. FIG. 6 illustrates a second example of the structure of the steering mechanism 170. In the example illustrated in FIG. 6, a gear box 173A includes a first rack and pinion mechanism that mechanically connects the steering shaft 171 and the tie rods 172, and a second rack and pinion mechanism that mechanically connects the steering motor 152 and the tie rods 172. The steering torque and the motor torque are separately input to the gear box 173A. The gear box 173A acts so as to combine these torques. Torque synthesized in this manner is transferred from the gear box 173A to the right and left tie rods 172. The tie rods 172 vary the angle of the front wheels FW according to a total value of the steering torque and the motor torque. The structure of the steering mechanism 170 is not limited to the examples illustrated in FIGS. 5 and 6, and may be determined as desired.

Figure 7:
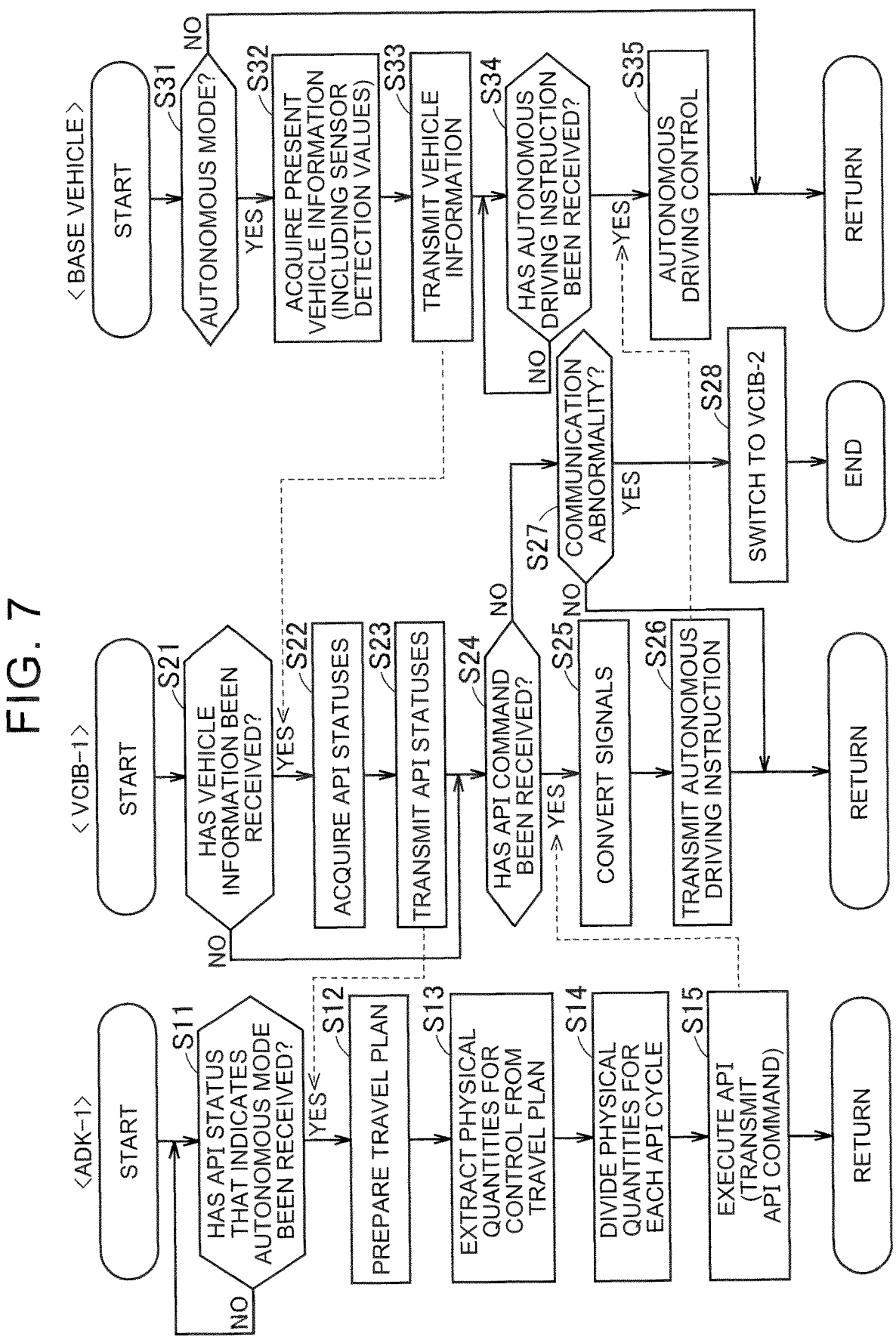
FIG. 7 is a flowchart illustrating autonomous driving control by the second control device (ADK-1) included in the autonomous driving kit illustrated in FIG. 2.

FIG. 7 is a flowchart illustrating autonomous driving control by the first ADC 211A (ADK-1) according to this embodiment. Steps in flowcharts will be represented simply as "S".

With reference to FIG. 7, a series of processes in S11 to S15 is executed by the first ADC 211A (ADK-1). In S11, the first ADC 211A determines whether an API status (vehicle mode status) that indicates the autonomous mode has been received from the first VCIB 111A (VCIB-1). While an API status that indicates the autonomous mode has not been received (NO in S11), the first ADC 211A does not execute the processes in and after S12, and repeatedly makes the determination in S11.

A series of processes in S21 to S28 is executed by the first VCIB 111A (VCIB-1). In S21, the first VCIB 111A determines whether the present vehicle information has been received from the base vehicle 120. When the present vehicle information has not been received (NO in S21), in the subsequent S24, the first VCIB 111A determines whether an API command has been received from the first ADC 211A (ADK-1). When an API command has not been received (NO in S24), in the subsequent S27, the first VCIB 111A determines whether an abnormality has been caused in communication between the first ADC 211A and the first VCIB 111A (see FIG. 3). A method of determining a communication abnormality will be discussed later. When a communication abnormality has not been caused (NO in S27), the process returns to the first step (S21).

A series of processes in S31 to S35 is executed by any of the plurality of control devices (e.g. the integrated control manager 130 and the control devices of the systems illustrated in FIGS. 1 to 4) included in the base vehicle 120. In S31, the base vehicle 120 determines whether the vehicle mode of the vehicle 1 is the autonomous mode. When the vehicle mode is not the autonomous mode (NO in S31), the process does not proceed to S32 and the subsequent processes, and the determination in S31 is repeatedly made. When the vehicle mode is the autonomous mode (YES in S31), on the other hand, the process proceeds to S32.

In S32, the base vehicle 120 acquires the present vehicle information. The present vehicle information includes information indicating that the vehicle mode is the autonomous mode. The present vehicle information may further include various sensor detection values that indicate the present state of the base vehicle 120. The present vehicle information may further include state determination results based on user operations or the sensor detection values. The base vehicle 120 may save the present vehicle information in a storage device in association with the time of acquisition. In the subsequent S33, the base vehicle 120 transmits the present vehicle information (latest vehicle information acquired in S32) to the first VCIB 111A. After that, in S34, the base vehicle 120 waits for an autonomous driving instruction from the first ADC 211A.

When the first VCIB 111A receives the present vehicle information from the base vehicle 120 (YES in S21), in the subsequent S22, the first VCIB 111A acquires API statuses that indicate the present state of the base vehicle 120 based on the present vehicle information. The first VCIB 111A may determine the values of the various API statuses based on the various sensor detection values. The API statuses acquired in S22 include the vehicle mode status that indicates the autonomous mode. In the subsequent S23, the first VCIB 111A transmits the API statuses (latest API statuses acquired in S22) to the first ADC 211A. After that, the process proceeds to S24.

When the first ADC 211A receives the above API statuses from the first VCIB 111A, YES is determined in S11, and the process proceeds to S12. The first ADC 211A receives the various API statuses including the vehicle mode status that indicates the autonomous mode from the first VCIB 111A. The first ADC 211A may save the values of the API statuses received from the first VCIB 111A in associated with the time of acquisition.

In S12, the first ADC 211A prepares a travel plan based on the detection results (environmental information and posture information) from the recognition sensor 212 and the posture sensor 213 and the API statuses acquired from the first VCIB 111A. The travel plan is data that indicate the behavior of the vehicle 1 as a target during a predetermined period. The first ADC 211A may prepare a travel plan that is suitable for the state of the vehicle 1 and the external environment by calculating the behavior of the vehicle 1 (such as the posture of the vehicle 1). When an API status about the purpose of travel (e.g. a destination) has been received from the first VCIB 111A, the first ADC 211A may prepare a travel plan for achieving the purpose of travel. When there is already a travel plan, the travel plan may be corrected.

In the subsequent S13, the first ADC 211A extracts physical quantities for control (such as acceleration and tire turning angle) from the travel plan prepared in S12. In the subsequent S14, the first ADC 211A divides the physical quantities extracted in S13 for each API cycle. In the subsequent S15, the first ADC 211A executes the API using the physical quantities divided in S14. Specifically, the first ADC 211A determines the values of the various API commands based on the physical quantities divided in S14. Consequently, API commands for implementing the physical quantities according to the travel plan are obtained. Then, the first ADC 211A transmits the obtained API commands to the first VCIB 111A. The API commands indicate instructions (including an autonomous driving instruction) for the base vehicle 120. After that, the process returns to the first step (S11). While the vehicle mode of the vehicle 1 is the autonomous mode, the processes in S12 to S15 are repeatedly executed so that instructions for autonomous driving are continuously issued from the first ADC 211A.

When the above API commands (S15) are received (YES in S24), in the subsequent S25, the first VCIB 111A converts the received API commands into internal instructions. Internal instructions corresponding to the various API commands for vehicle control are obtained through such signal conversion. In the subsequent S26, the first VCIB 111A transmits the obtained internal instructions to the base vehicle 120. The internal instructions transmitted here include an internal instruction for autonomous driving (i.e. an autonomous driving instruction from the first ADC 211A). When the process in S26 is executed, the process returns to the first step S21.

When the above autonomous driving instruction (S26) is received (YES in S34), in the subsequent S35, the base vehicle 120 executes autonomous driving control according to the received autonomous driving instruction. Consequently, autonomous driving of the vehicle 1 is executed. After that, the process returns to the first step S31. While the vehicle mode of the vehicle 1 is the autonomous mode, the base vehicle 120 continuously executes autonomous driving control for the vehicle 1 while receiving the autonomous driving instruction from the first VCIB 111A.

When API commands are not received from the first ADC 211A (NO in S24), the first VCIB 111A executes a determination about a communication abnormality in S27. The first VCIB 111A may determine the presence or absence of a communication abnormality due to a wire break by executing a check for a wire break in a communication line. Alternatively, the first VCIB 111A may transmit a confirmation signal to the first ADC 211A, and determine the presence or absence of a communication abnormality based on the presence or absence of a reply from the first ADC 211A. Alternatively, the first VCIB 111A may determine that a communication abnormality has been caused when API commands are not received from the first ADC 211A within a predetermined time since the API statuses are transmitted to the first ADC 211A in S23. When an abnormality has been caused in communication between the first ADC 211A and the first VCIB 111A (YES in S27), in S28, the first VCIB 111A requests the second VCIB 111B (VCIB-2) to execute control in place of the first VCIB 111A (VCIB-1). When the process in S28 is executed, the series of processes in S21 to S28 is ended. Then, when the request in S28 is received, the second VCIB 111B starts a series of processes in S20A, S20B, S21A, and S22 to S26 illustrated in FIG. 8. The base vehicle 120 continuously executes the series of processes in S31 to S35. In addition, the first ADC 211A continuously executes the series of processes in S11 to S15 until a notification (see S10 in FIG. 8) is received from the second ADC 211B.

Figure 8:
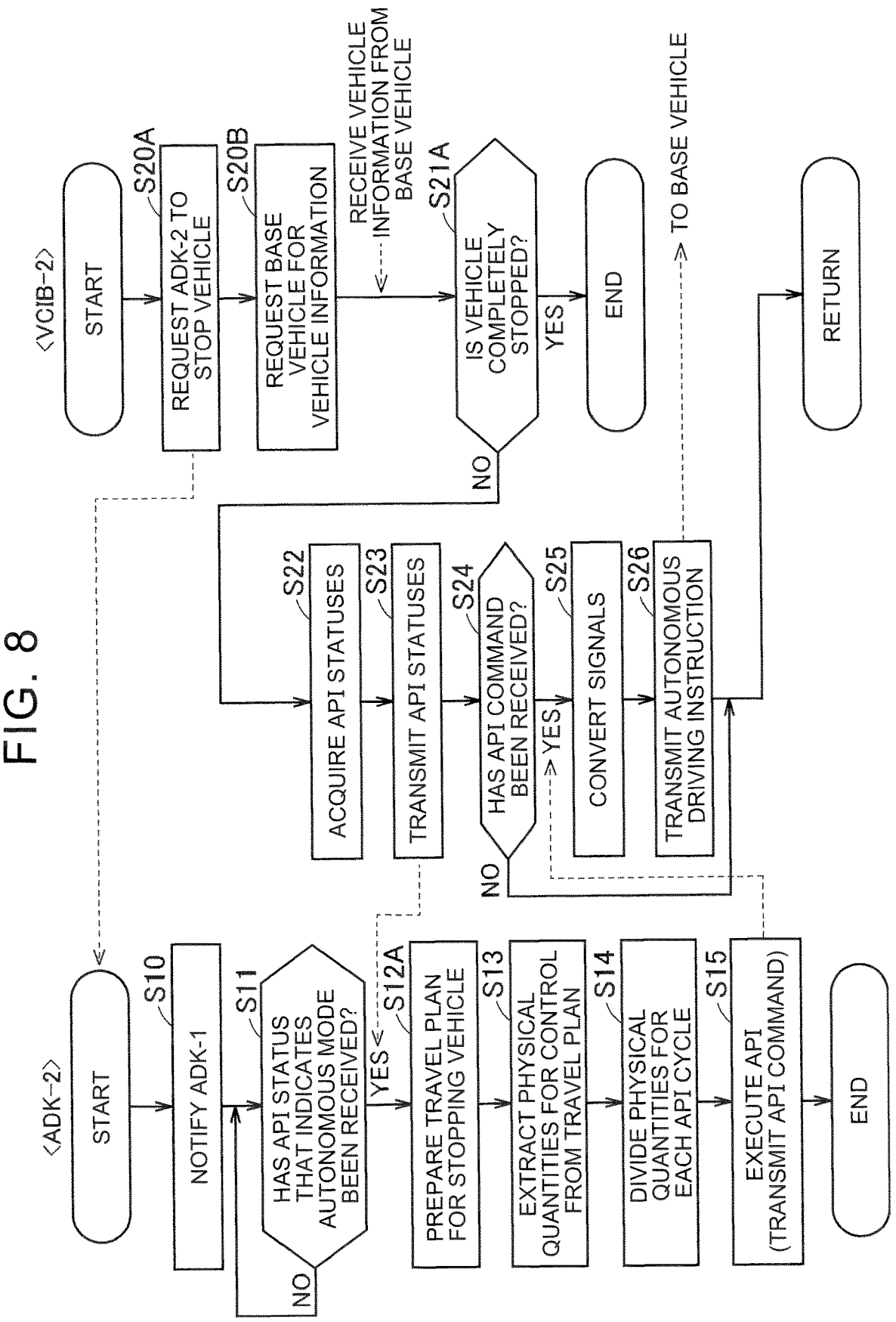
FIG. 8 is a flowchart illustrating autonomous driving control by the second control device (ADK-2) included in the autonomous driving kit illustrated in FIG. 2.

FIG. 8 is a flowchart illustrating autonomous driving control by the second ADC 211B (ADK-2) according to this embodiment.

With reference to FIG. 8, in S20A, the second VCIB 111B (VCIB-2) requests the second ADC 211B (ADK-2) for autonomous driving control for stopping the vehicle 1. When the request in S20A is received, the second ADC 211B starts a series of processes in S10, S11, S12A, and S13 to S15. First, in S10, the second ADC 211B notifies the first ADC 211A (ADK-1) that autonomous driving control is executed by the second ADC 211B. When this notification is received, the first ADC 211A ends the series of processes in S11 to S15 illustrated in FIG. 7. Subsequently, in S11, the second ADC 211B stands by until an API status that indicates the autonomous mode is received, and prepares a travel plan in S12A when an API status that indicates the autonomous mode is received (YES in S11). S11 and S12A in FIG. 8 correspond to S11 and S12, respectively, in FIG. 7. In S12A, however, the second ADC 211B prepares a travel plan for stopping the vehicle. Subsequently, the second ADC 211B executes the processes in S13 to S15. Since S13 to S15 in FIG. 8 and S13 to S15 in FIG. 7 are the same, such steps will not be repeatedly described. When the process in S15 is executed, the series of processes is ended. However, the second ADC 211B starts the series of processes each time the request in S20A is received.

After the process in S20A is executed, in S20B, the second VCIB 111B requests the base vehicle 120 for vehicle information. When the request in S20B is received, in S33 in FIG. 7, the base vehicle 120 transmits the present vehicle information to the second VCIB 111B in place of the first VCIB 111A. When the present vehicle information is received from the base vehicle 120, in the subsequent S21A, the second VCIB 111B determines whether the vehicle 1 is in a stopped state based on the present vehicle information. When the vehicle 1 is not completely stopped (No in S21A), the process proceeds to S22. Since S22 to S26 in FIG. 8 and S22 to S26 in FIG. 7 are the same, such steps will not be repeatedly described. When NO is determined in S24 in the series of processes illustrated in FIG. 8, however, the process returns to the first step (S20A). While the vehicle mode of the vehicle 1 is the autonomous mode, the processes in S12A to S15 are repeatedly executed so that instructions for stopping the vehicle are continuously issued from the second ADC 211B. Then, vehicle stop control for the vehicle 1 is continuously executed while the base vehicle 120 is receiving the autonomous driving instruction (instruction for stopping the vehicle) from the second VCIB 111B. When the vehicle 1 is completely stopped (YES in S21A), the series of processes illustrated in FIG. 8 is ended.

Figure 9:
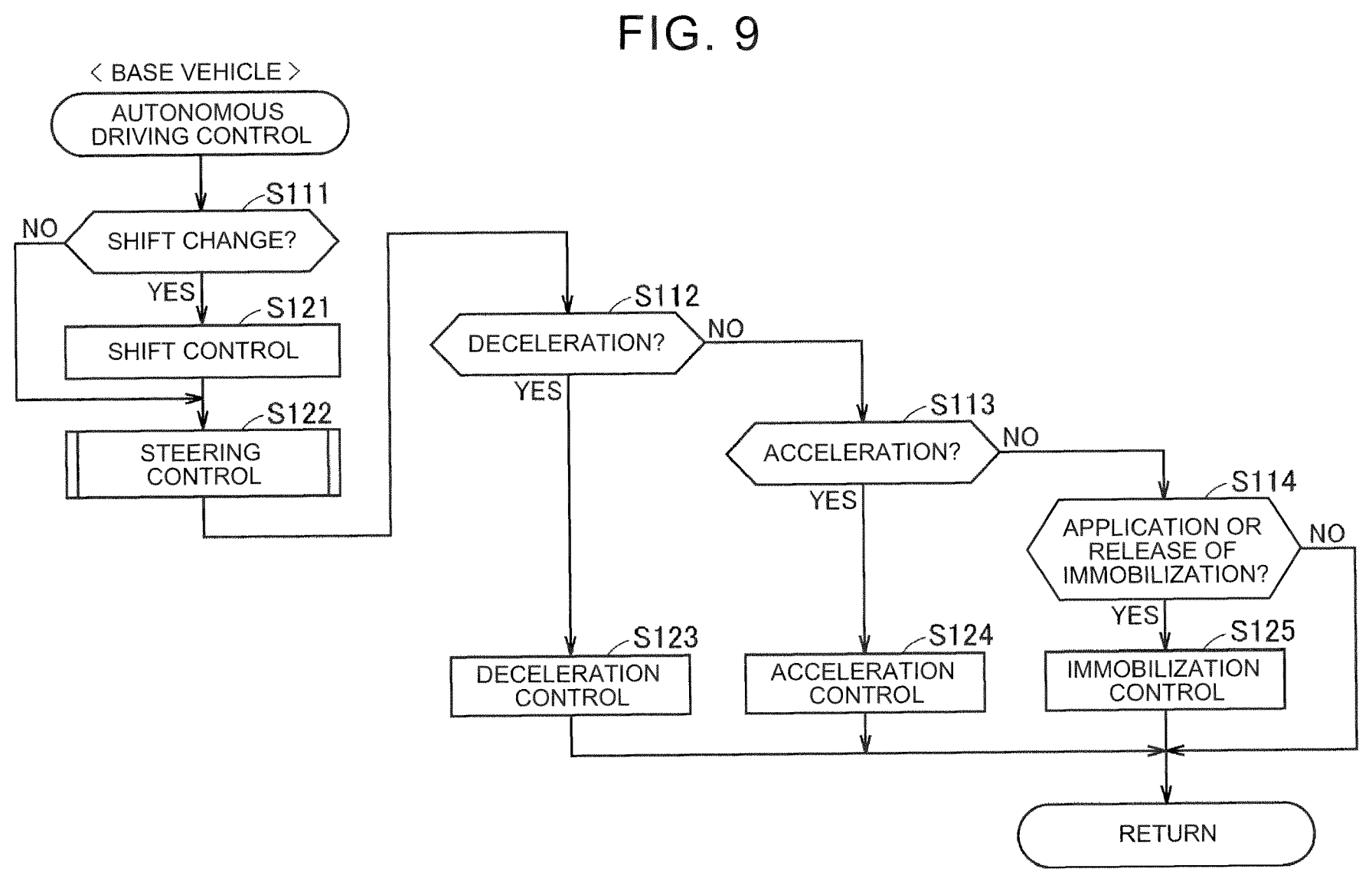

FIG. 9 is a flowchart illustrating an example of autonomous driving control (S35 in FIG. 7) executed according to instructions from the ADK 200 by the base vehicle 120. The autonomous driving control illustrated in FIG. 9 is executed according to instructions from the first ADC 211A by the various control devices (specifically, the ECUs of the systems and the motion manager 141A illustrated in FIGS. 2 to 4) of the base vehicle 120 when there is no communication abnormality.

With reference to FIG. 9 together with FIGS. 2 to 4, in S111, the motion manager 141A determines whether to make a shift change based on an instruction (e.g. a propulsion direction command and an immobilization command) from the ADK 200. When it is determined to make a shift change (YES in S111), in S121, the ECU of the steering control unit 123C executes shift control for a shift change requested by the ADK 200. After that, the process proceeds to S122. When it is determined not to make a shift change (NO in S111), on the other hand, the process skips S121 and proceeds to S122. In S122, the steering ECU 151A executes steering control. The steering control will be discussed in detail later.

Subsequently, in S112, the motion manager 141A determines whether to decelerate based on an instruction (e.g. an acceleration command) from the ADK 200. When it is determined to decelerate (YES in S112), in S123, the brake ECU 142A executes deceleration control for deceleration requested by the ADK 200. When it is determined not to decelerate (NO in S112), on the other hand, the process proceeds to S113.

In S113, the motion manager 141A determines whether to accelerate based on an instruction (e.g. an acceleration command) from the ADK 200. When it is determined to accelerate (YES in S113), in S124, the ECU of the propulsion control unit 123C executes acceleration control for acceleration requested by the ADK 200. When it is determined not to accelerate (NO in S113), on the other hand, the process proceeds to S114.

In S114, the motion manager 141A determines whether to execute application or release of immobilization based on an instruction (e.g. an immobilization command) from the ADK 200. When it is determined to execute application or release of immobilization (YES in S114), in S125, the ECU of the EPB control unit 123A executes immobilization control for application or release of immobilization requested by the ADK 200. When neither application nor release of immobilization is requested (e.g. when the immobilization command indicates a value "0"), NO is determined in S114, and the series of processes illustrated in FIG. 9 is ended. Consequently, the process returns to the flowchart in FIG. 7, and S35 is ended. Also when any of the processes in S123 to S125 is executed, S35 in FIG. 7 is ended in the same manner. As a result, the process returns to S31 in FIG. 7.

The steering control (S122 in FIG. 9) executed by the base vehicle 120 will be described below with reference to FIGS. 10 to 13.

Figures 10, 11:
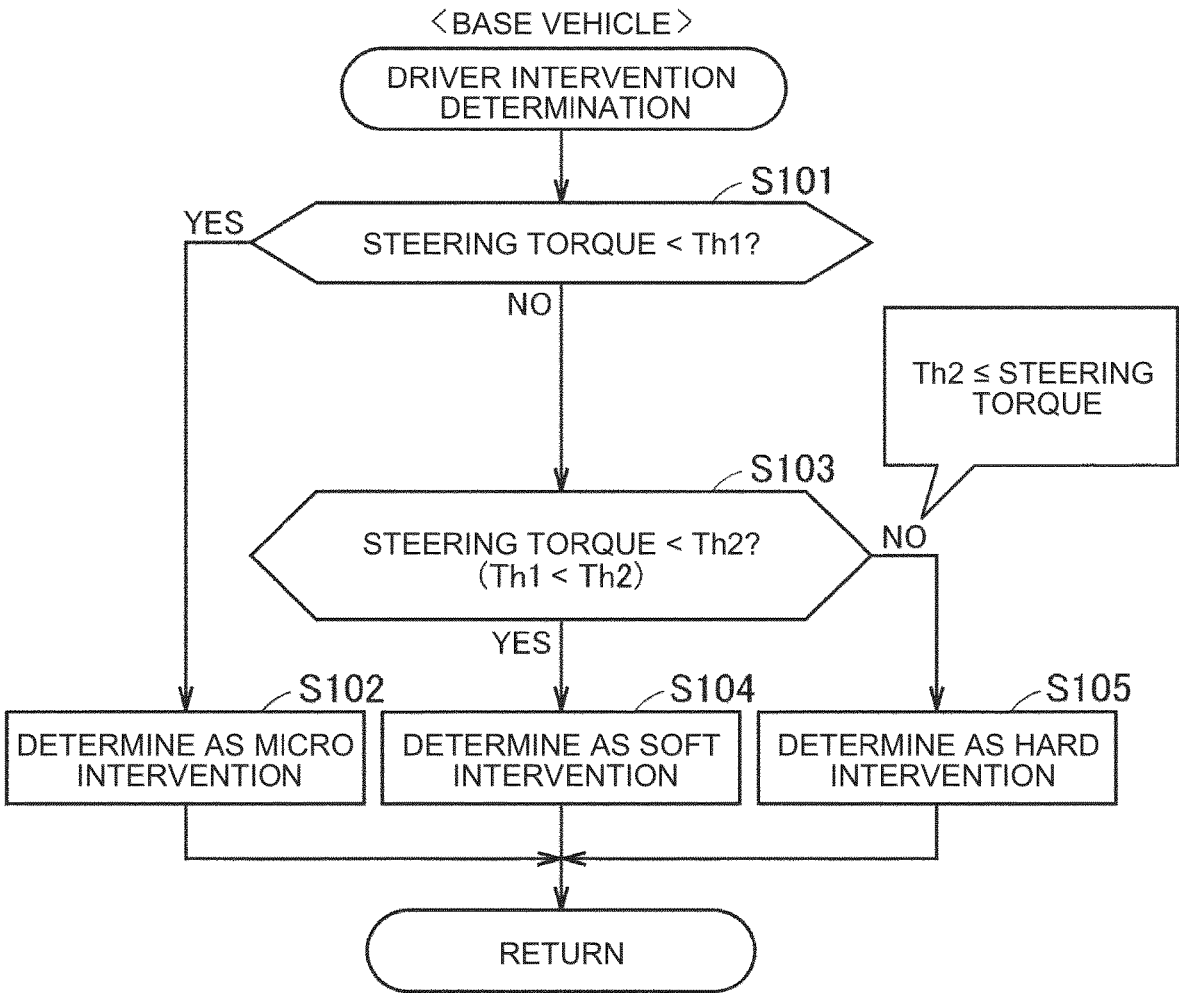
FIG. 10 illustrates a driver intervention status used in steering control according to the embodiment of the present disclosure.
FIG. 11 is a flowchart illustrating an example of a process related to driver intervention determination executed in the control illustrated in FIG. 7.

FIG. 10 illustrates a driver intervention status. With reference to FIG. 10, the driver intervention status outputs a corresponding value "0", "1", or "2" when the handle intervention by the driver (hereinafter referred to simply as "driver intervention") is micro intervention (first category), soft intervention (second category), or hard intervention (third category). The micro intervention indicates that there is no operation or a slight operation of the steering wheel. The soft intervention indicates that there is an operation of the steering wheel that is larger than the micro intervention and smaller than the hard intervention. The hard intervention indicates that there is an operation of the steering wheel that is larger than the soft intervention. In this embodiment, the driver intervention status is set to a value that matches steering torque input from the driver to the steering wheel.

FIG. 11 is a flowchart illustrating an example of a process related to driver intervention determination executed by the base vehicle 120. In this embodiment, in S32 in FIG. 7, the steering ECU 151A (the steering ECU 151B in case of a communication abnormality) of the base vehicle 120 executes a series of processes illustrated in FIG. 11 and described below. The steering ECU acquires steering torque based on a detection value from the torque sensor 162 (FIG. 4), for example.

With reference to FIG. 11, in S101, the base vehicle 120 determines whether the steering torque is less than a predetermined value (hereinafter represented as "Th1"). When it is determined that the steering torque is less than Th1 (YES in S101), in S102, the base vehicle 120 classifies the driver intervention into micro intervention. When it is determined that the steering torque is not less than Th1 (NO in S101), on the other hand, in S103, the base vehicle 120 determines whether the steering torque is less than a predetermined value (hereinafter represented as "Th2"). Th2 is larger than Th1. When it is determined that the steering torque is less than Th2 (YES in S103), in S104, the base vehicle 120 classifies the driver intervention into soft intervention. When it is determined that the steering torque is not less than Th2 (NO in S103), on the other hand, in S105, the base vehicle 120 classifies the driver intervention into hard intervention. Th1 and Th2 correspond to thresholds for the base vehicle 120 to determine the state of driver intervention (micro intervention, soft intervention, or hard intervention).

In the process illustrated in FIG. 11, as described above, the driver intervention is classified into one of micro intervention (first category), soft intervention (second category), and hard intervention (third category). In the process illustrated in FIG. 7, in S33, the base vehicle 120 transmits the classification results to the VCIB 110. When the classification results are received, the VCIB 110 sets the driver intervention status to a value that matches the classification results in S22, and transmits the driver intervention status to the ADK 200 in S23.

Figure 12:
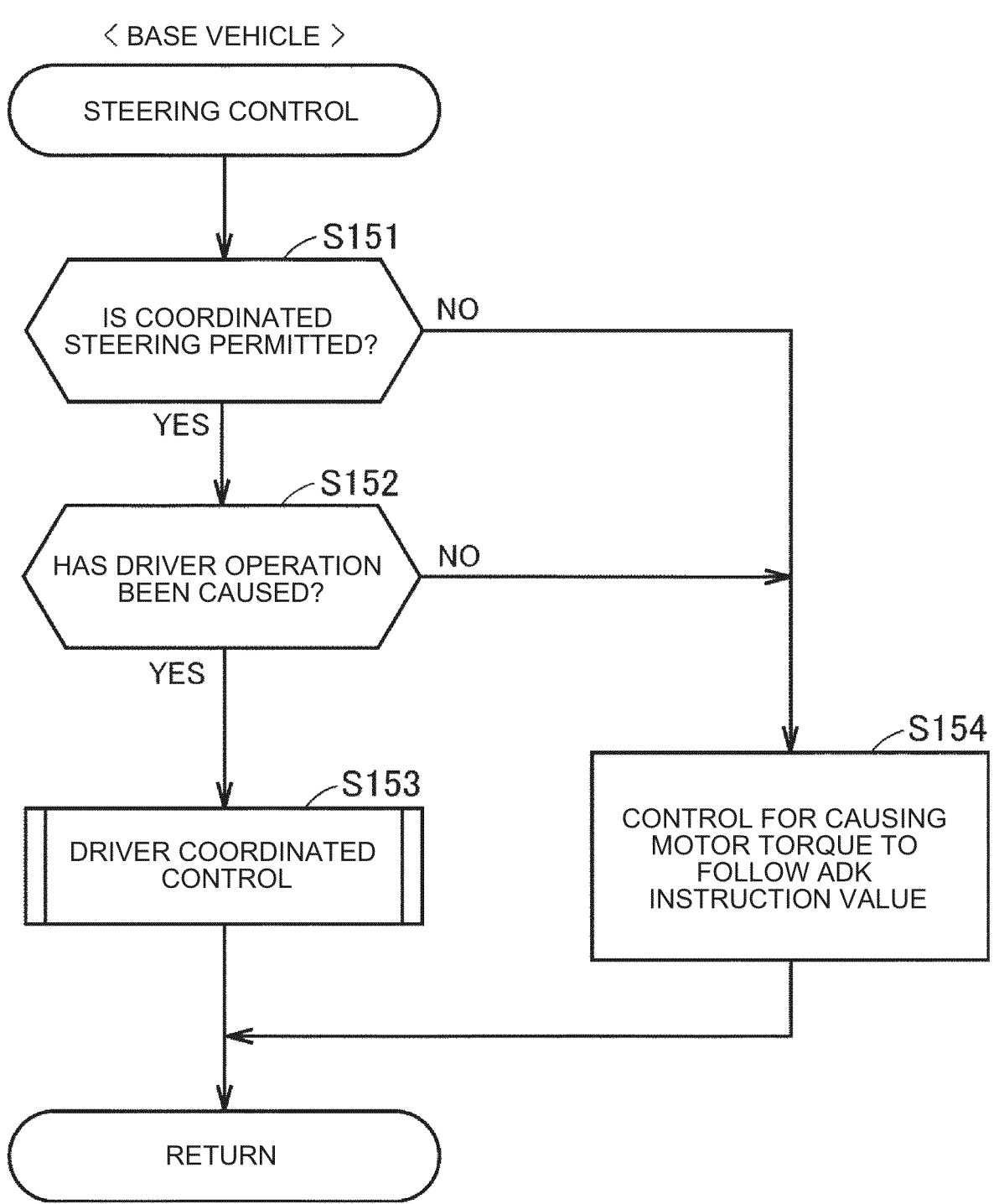
FIG. 12 is a flowchart illustrating an example of steering control executed in the autonomous driving control illustrated in FIG. 9.

In this embodiment, the classification results (driver intervention determination results) are used in steering control (S122 in FIG. 9). FIG. 12 is a flowchart illustrating an example of steering control executed in S122 in FIG. 9.

With reference to FIG. 12 together with FIGS. 2 and 4, in S151, the steering ECU 151A determines whether coordinated steering between the ADK 200 (device) and the driver (human) is permitted. The state of whether coordinated steering is permitted or prohibited in the VP 100 is switched according to the coordinated steering command from the ADK 200. The determination results in S151 are reflected in the coordinated steering status. When coordinated steering is permitted, the steering ECU 151A determines YES in S151, and advances the process to S152. When coordinated steering is prohibited, the steering ECU 151A determines NO in S151, and advances the process to S154. The ADK 200 may determine the value of the coordinated steering command according to the status of the vehicle 1. The ADK 200 may determine the value of the coordinated steering command based on the environmental information acquired by the recognition sensor 212, for example.

In S154, the steering ECU 151A controls torque (motor torque) of the steering motor 152 such that the angle of the front wheels FW approaches the steering angle instruction value requested by the ADK 200. In this case, coordinated steering is prohibited. When the process in S154 is executed, the process returns to the flowchart in FIG. 9. Consequently, S122 in FIG. 9 is ended, and the process proceeds to S112 in FIG. 9. During autonomous driving in which coordinated steering is prohibited, the control in S154 is continuously executed so that the angle of the front wheels FW follows an instruction value (specifically, a front wheel steering angle instruction value indicated by the front wheel steering angle command) from the ADK 200. The angle of the front wheels FW is reflected in the front wheel steering angle status.

In S152, the steering ECU 151A determines whether a driver operation has been caused on the steering wheel 161. The steering ECU 151A may determine whether a driver operation has been caused based on at least one of the steering angular speed, the steering angle, and steering torque of the steering wheel 161. For example, the steering ECU 151A may determine that a driver operation has been caused when the absolute value of the steering angular speed of the steering wheel 161 is equal to or more than a predetermined value, and may determine that a driver operation has not been caused otherwise. The steering angular speed of the steering wheel 161 corresponds to the value of the handle angular speed status. Alternatively, the steering ECU 151A may determine that a driver operation has been caused when the amount of variation in the steering angle of the steering wheel 161 (e.g. the absolute value of the difference between the preceding value and the current value of the steering angle) is equal to or more than a predetermined value, and may determine that a driver operation has not been caused otherwise. The steering angle of the steering wheel 161 corresponds to the value of the handle angle status. Alternatively, the steering ECU 151A may determine that a driver operation has been caused when the amount of variation in the steering torque (e.g. the absolute value of the difference between the preceding value and the current value of the steering torque) is equal to or more than a predetermined value, and may determine that a driver operation has not been caused otherwise. The steering torque is detected by the torque sensor 162. In this embodiment, YES may be determined in S152 not only when the driver turns the steering wheel 161 that has been in the straight state (steering angle=0) to the right or the left but also when the driver turns the steering wheel 161 that has been turned to the right or the left back to the straight state. However, this is not limiting, and YES may be determined in S152 only when the driver turns the steering wheel 161 to the right or the left.

Figure 13:
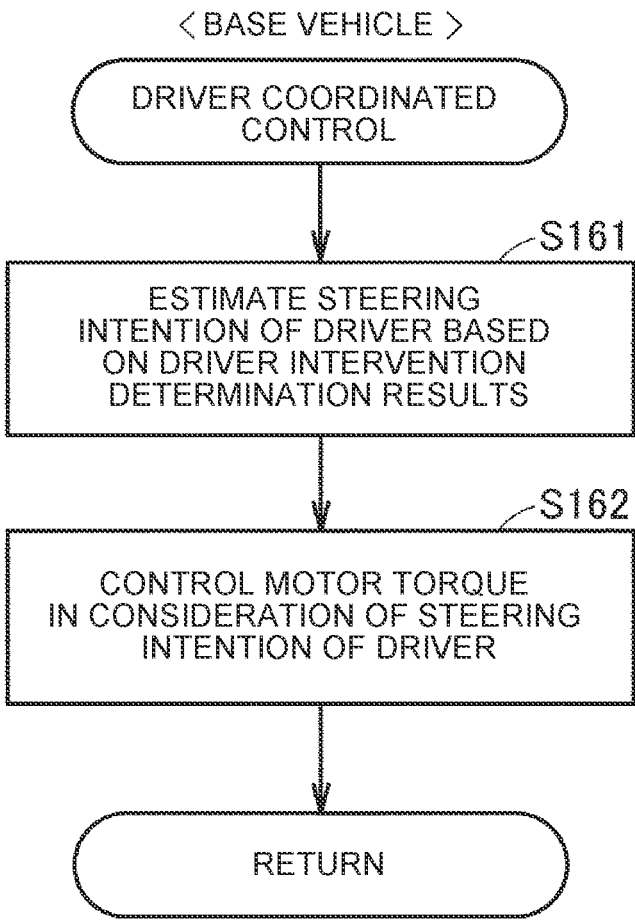
FIG. 13 is a flowchart illustrating an example of driver coordinated control executed in the steering control illustrated in FIG. 12.

When it is determined that a driver operation has not been caused (NO in S152), the process proceeds to S154. In S154, as discussed earlier, motor torque control in which the angle (front wheel tire turning angle) of the front wheels FW is caused to follow an instruction value from the ADK 200 is executed. When it is determined that a driver operation has been caused (YES in S152), on the other hand, in S153, the steering ECU 151A executes driver coordinated control based on the ADK 200 (device) and the driver (human). Specifically, the steering ECU 151A executes driver coordinated control based on the results of the driver intervention determination illustrated in FIG. 11. FIG. 13 is a flowchart illustrating an example of driver coordinated control executed in S153 in FIG. 12.

With reference to FIG. 13 together with FIGS. 2 and 4, in S161, the steering ECU 151A estimates the steering intention of the driver based on the driver intervention determination results (classification results). In the subsequent S162, the steering ECU 151A executes motor torque control in consideration of the estimated steering intention of the driver.

For example, when the driver intervention is micro intervention, the steering ECU 151A estimates the steering intention of the driver as straight travel maintenance in S161, and determines target motor torque that matches the front wheel steering angle instruction value from the ADK 200 and the amount of steering (e.g. the steering angular speed, the steering angle, or steering torque) by the driver according to a first control rule for straight travel maintenance and controls torque of the steering motor 152 so as to approach the target motor torque in S162.

When the driver intervention is soft intervention, the steering ECU 151A estimates the steering intention of the driver as a lane change in S161, and determines target motor torque that matches the front wheel steering angle instruction value from the ADK 200 and the amount of steering (e.g. the steering angular speed, the steering angle, or steering torque) by the driver according to a second control rule for a lane change and controls torque of the steering motor 152 so as to approach the target motor torque in S162.

When the driver intervention is hard intervention, the steering ECU 151A estimates the steering intention of the driver as obstacle avoidance in S161, and determines target motor torque that matches the front wheel steering angle instruction value from the ADK 200 and the amount of steering (e.g. the steering angular speed, the steering angle, or steering torque) by the driver according to a third control rule for obstacle avoidance and controls torque of the steering motor 152 so as to approach the target motor torque in S162.

When the process in S162 is executed, the process returns to the flowchart in FIG. 12. Consequently, the series of processes illustrated in FIG. 12 is ended, and the process proceeds to S112 in FIG. 9. The first control rule, the second control rule, and the third control rule may be adapted in advance for straight travel maintenance, lane changes, and obstacle avoidance, respectively, and stored in the vehicle 1 (storage device). The control rules may be consecutively updated by OTA. Each of the first to third control rules may be a map, a formula, or a model. The first to third control rules may prescribe the relationship among the front wheel steering angle instruction value from the ADK 200, the amount of steering by the driver, and the target torque for the motor 152 in different manners. The steering intention is not limited to straight travel maintenance, a lane change, and obstacle avoidance. The number of categories of the steering intention is not limited to three, and may be four or more. Candidates for the steering intention may include at least one of a sharp curve and a U-turn, in addition to or as an alternative to at least one of straight travel maintenance, a lane change, and obstacle avoidance. In S161 in FIG. 13, the steering ECU 151A may estimate the steering intention of the driver more specifically using not only the driver intervention determination results (classification results) but also at least one of a history of steering (e.g. a history of the steering angle or steering torque) by the driver and the surrounding circumstances of the vehicle 1 detected by the camera 129A. A control rule for each steering intention may be stored in the vehicle 1 (storage device).

As described above, the vehicle 1 according to this embodiment includes the VP 100 (vehicle platform) and the ADK 200 (autonomous driving kit) (see FIGS. 1 and 2). The VP 100 receives an instruction from the ADK 200 (see FIGS. 3, 7, and 8). Specifically, the VP 100 is configured to receive a front wheel steering angle instruction value (front wheel steering angle command) requested by the ADK 200 during autonomous driving of the vehicle 1. The VP 100 includes the steering ECU 151A (first control device) that controls the steering motor 152. The steering ECU 151A classifies driver intervention to the steering wheel 161 into one of a plurality of categories (see FIG. 11), and controls torque of the steering motor 152 in consideration of the steering intention of the driver (S161 and S162 in FIG. 13), during autonomous driving of the vehicle 1. With such a configuration, it is easy to achieve both the convenience and the travel stability of the vehicle 1 capable of autonomous driving by allowing steering of the vehicle 1 through coordination between the ADK 200 (device) and the driver (human).

The steering ECU 151A is configured to classify driver intervention into one of the categories based on steering torque (see FIG. 11). With such a configuration, the steering ECU 151A can easily grasp the steering intention of the driver based on the classification result.

When a driver operation is caused on the steering wheel 161 during autonomous driving of the vehicle 1 (see FIG. 12), the steering ECU 151A estimates the steering intention of the driver based on the result of classifying driver intervention into one of the categories (S161 in FIG. 13), and changes the control mode for torque of the steering motor according to the estimated steering intention of the driver (S162 in FIG. 13). With such a configuration, the steering ECU 151A can easily control torque of the steering motor in a control mode that matches the steering intention of the driver.

The steering ECU 151A is configured to execute one of instruction value following control (S154 in FIG. 12), in which the angle of the front wheels FW is caused to follow the front wheel steering angle instruction value from the ADK 200, and driver coordinated control (S153 in FIG. 12), in which torque of the steering motor 152 is controlled in consideration of the steering intention of the driver, during autonomous driving of the vehicle 1. The steering ECU 151A gives priority to followability to the front wheel steering angle instruction value over coordination with the driver of the vehicle 1 during execution of instruction value following control, and gives priority to coordination with the driver of the vehicle 1 over followability to the front wheel steering angle instruction value during execution of driver coordinated control. With such a configuration, it is easy to achieve both the convenience and the travel stability of the vehicle capable of autonomous driving.

The VP 100 is configured such that switching between a coordination permitted state and a coordination prohibited state is made according to an instruction (coordinated steering command) from the ADK 200. The coordination permitted state is a state in which coordinated steering with the driver is permitted. The coordination prohibited state is a state in which the coordinated steering with the driver is prohibited. With such a configuration, it is easy to achieve both the convenience and the travel stability of the vehicle capable of autonomous driving.

In the vehicle 1 according to this embodiment, the first control device (control device for the base vehicle 120) transmits vehicle information about the base vehicle 120 to the third control device (control device for the VCIB 110) (S33 in FIG. 7). An application program interface (API) signal defined by an API is used for communication between the second control device (control device for the ADK 200) and the third control device. The API signal includes an API command that indicates an instruction for the base vehicle 120 and an API status that indicates the state of the base vehicle 120 (see FIG. 7). The third control device converts the API command from the second control device into a signal that is executable by the first control device (S25 in FIG. 7), and transmits the converted signal to the first control device (S26 in FIG. 7). The third control device acquires an API status using the vehicle information from the first control device (S22 in FIG. 7), and transmits the acquired API status to the second control device (S23 in FIG. 7). With such a configuration, it is possible to use signals of different types on the base vehicle 120 side and the ADK 200 side of the VCIB 110. Consequently, development of the ADK 200 is promoted.

In the above embodiment, the control device for the base vehicle 120 changes the mode of motor torque control in driver coordinated control based on the results of classifying driver intervention (i.e. the results of driver intervention determination illustrated in FIG. 11) (see FIG. 13). However, the use of the results of classifying driver intervention is not limited thereto, and the results of classifying driver intervention may be used for any use. For example, the control device for the ADK 200 may determine a command related to autonomous driving control using the results of classifying driver intervention as described below.

Figure 14:
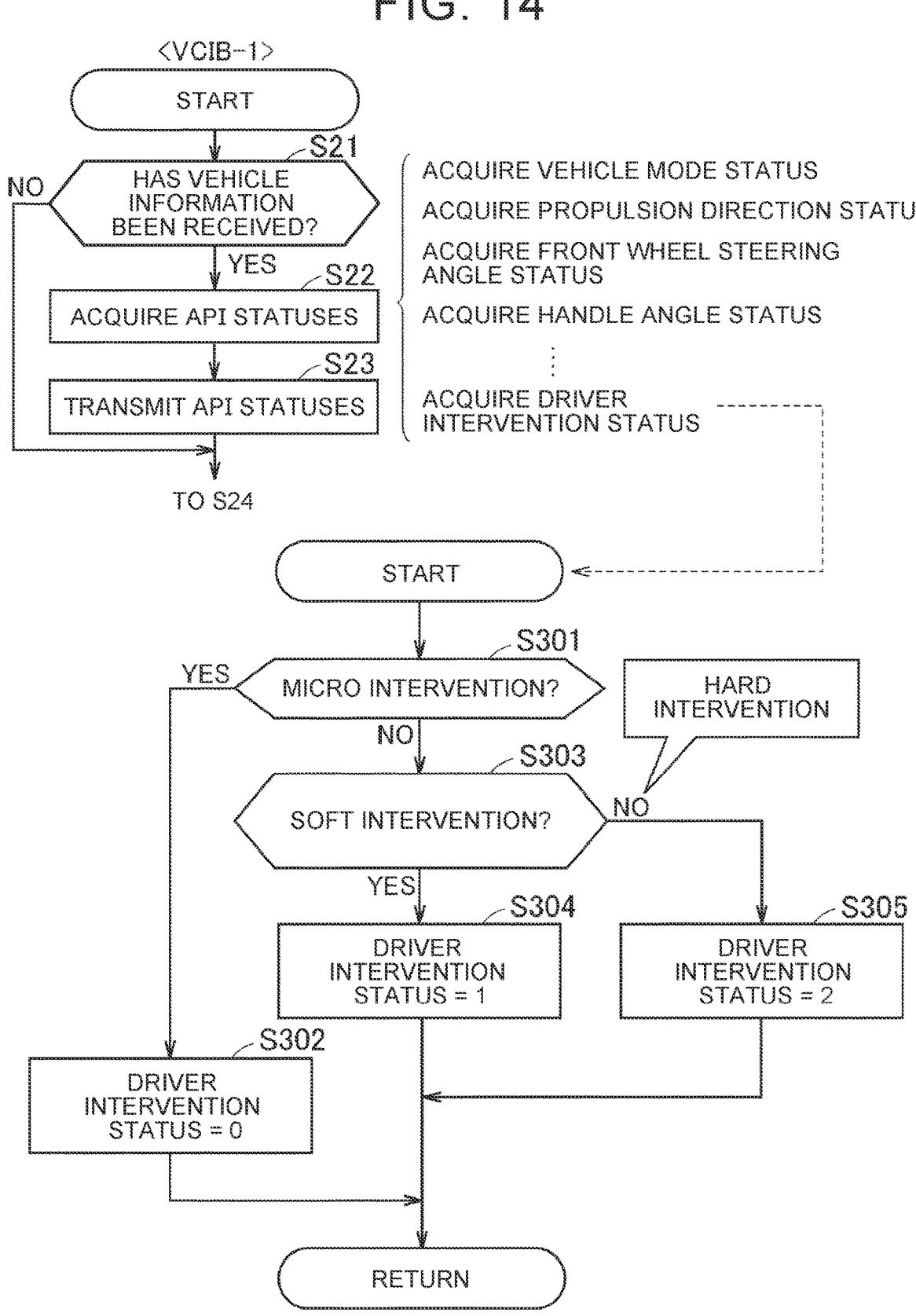
FIG. 14 is a flowchart illustrating a process related to driver intervention status setting executed in the control illustrated in FIG. 7.

The ADK 200 can acquire the results of classifying driver intervention through the process illustrated in FIG. 7. Specifically, in S33, information that indicates the results of classifying driver intervention is transmitted from the base vehicle 120 to the first VCIB 111A. In S22, the first VCIB 111A may set the driver intervention status to a value that matches the results of classifying driver intervention (one of micro intervention, soft intervention, and hard intervention). FIG. 14 is a flowchart illustrating a process related to driver intervention status setting (S22 in FIG. 7) executed by the first VCIB 111A. As illustrated in FIG. 14, when driver intervention is classified into micro intervention (YES in S301), the first VCIB 111A sets the driver intervention status to "0" (S302). When driver intervention is classified into soft intervention (NO in S301 and YES in S303), the first VCIB 111A sets the driver intervention status to "1" (S304). When driver intervention is classified into hard intervention (NO in both S301 and S303), the first VCIB 111A sets the driver intervention status to "2" (S305).

Figure 15:
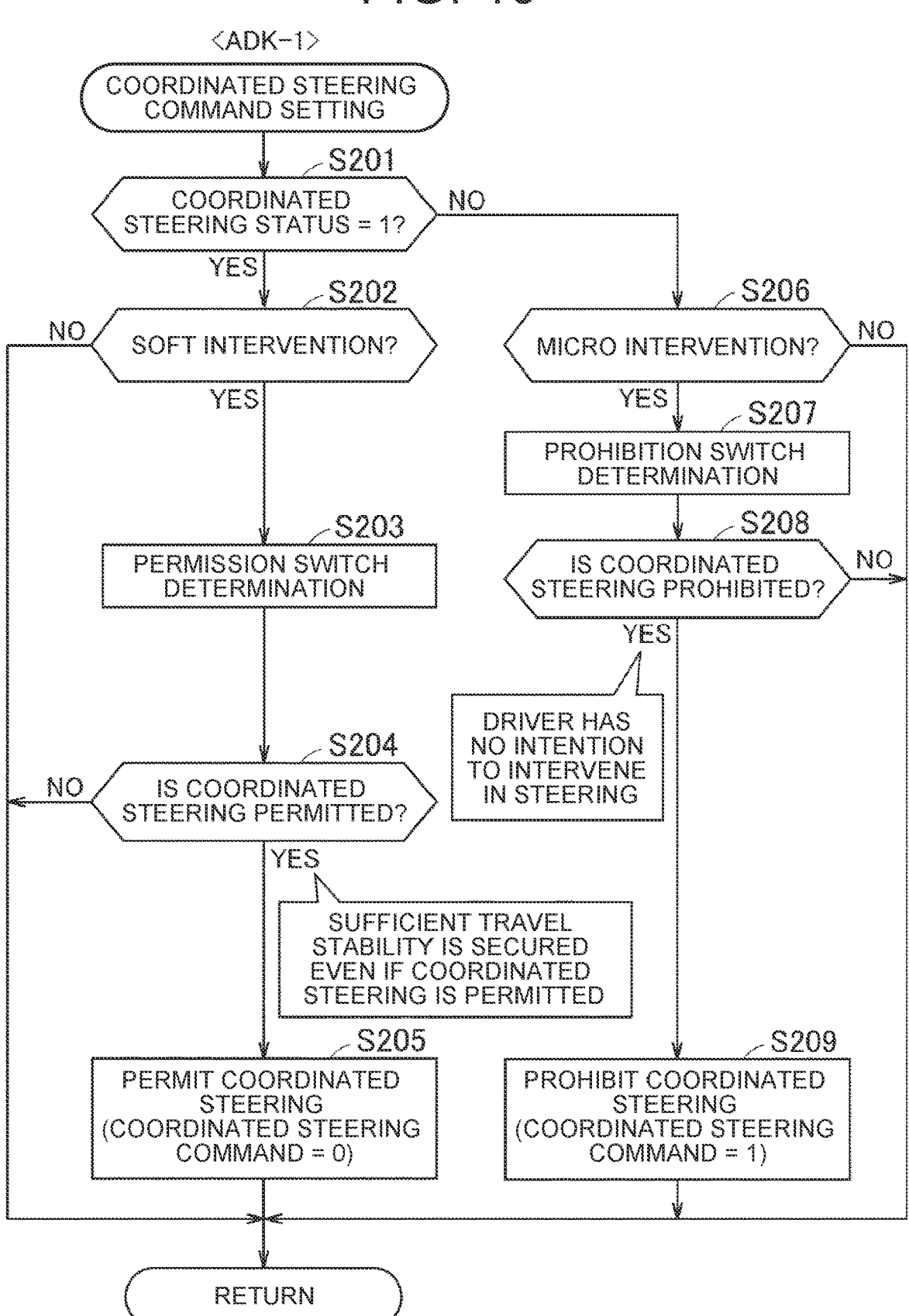
FIG. 15 is a flowchart illustrating coordinated steering command setting based on the driver intervention status set through the process illustrated in FIG. 14.

In the subsequent S23, the driver intervention status set as described above is transmitted from the first VCIB 111A to the first ADC 211A. The first ADC 211A may determine whether to permit driver coordinated control using the driver intervention status. For example, the first ADC 211A may set the value of the coordinated steering command using the driver intervention status in S15 in FIG. 7. The coordinated steering command provides an instruction as to which of the coordination permitted state and the coordination prohibited state the VP 100 is brought into. FIG. 15 is a flowchart illustrating a process related to coordinated steering command setting executed by the first ADC 211A.

With reference to FIG. 15, in S201, the first ADC 211A determines whether the present value of the coordinated steering status is "1" (prohibited). When the value of the coordinated steering status is "1" (YES in S201), in S202, the first ADC 211A determines whether the driver intervention status indicates soft intervention (1). When the driver intervention status indicates soft intervention (YES in S202), in S203, the first ADC 211A executes a determination as to whether sufficient travel stability is secured even if coordinated steering (driver coordinated control) is permitted. When the driver intervention status indicates soft intervention, it is estimated that preparation for driving by the driver has been completed. The first ADC 211A may confirm the status of the vehicle 1 and the driver based on the history of steering (e.g. a history of the steering angle or steering torque) by the driver and the environmental information acquired by the recognition sensor 212. In the subsequent S204, the first ADC 211A determines whether driver coordinated control is permitted based on the results of the determination in S203. Specifically, driver coordinated control is permitted when it is determined that sufficient travel stability is secured even if driver coordinated control is permitted, and driver coordinated control is not permitted otherwise. For example, when it is determined that steering by the driver is unstable in S203, the first ADC 211A may determine that driver coordinated control is not permitted. In addition, the first ADC 211A may determine that driver coordinated control is not permitted also when it is determined that a different vehicle is present around the vehicle 1 in S203.

When it is determined that driver coordinated control is permitted (YES in S204), in S205, the first ADC 211A sets the coordinated steering command to "0" (permitted). Consequently, coordinated steering (driver coordinated control) between the ADK 200 and the driver is permitted. When NO is determined in S202 or S204, the series of processes illustrated in FIG. 15 is ended without changing the coordinated steering command.

When the present value of the coordinated steering status is "0" (NO in S201), in S206, the first ADC 211A determines whether the driver intervention status indicates micro intervention (0). When the driver intervention status indicates micro intervention (YES in S206), in S207, the first ADC 211A executes a determination as to whether sufficient convenience is secured even if coordinated steering (driver coordinated control) is prohibited. When the driver intervention status indicates micro intervention, there is a possibility that the driver has no intention to intervene in steering (intention to drive). The first ADC 211A may confirm the intention to drive of the driver based on the history of steering (e.g. a history of the steering angle or steering torque) by the driver. In the subsequent S208, the first ADC 211A determines whether driver coordinated control is prohibited based on the results of the determination in S207. Specifically, driver coordinated control is prohibited when it is determined that sufficient convenience is secured even if driver coordinated control is prohibited, and driver coordinated control is not prohibited otherwise. For example, when it is determined that the driver is not touching the steering wheel 161 continuously for a predetermined time in S207, the first ADC 211A may determine that driver coordinated control is prohibited.

When it is determined that driver coordinated control is prohibited (YES in S208), in S209, the first ADC 211A sets the coordinated steering command to "1" (prohibited). Consequently, coordinated steering (driver coordinated control) between the ADK 200 and the driver is prohibited. When NO is determined in S206 or S208, the series of processes illustrated in FIG. 15 is ended without changing the coordinated steering command.

In the control illustrated in FIG. 15, when the VP 100 is in the coordination prohibited state and the driver intervention is classified into soft intervention (second category), the first ADC 211A (second control device) determines whether the VP 100 is brought into the coordination permitted state (S203 and S204). When the VP 100 is in the coordination permitted state and the driver intervention is classified into micro intervention (first category), the first ADC 211A (second control device) determines whether the VP 100 is brought into the coordination prohibited state (S207 and S208). With such a configuration, the ADK 200 can easily make switching between the coordination permitted state and the coordination prohibited state appropriately.

When a communication abnormality (see S27 in FIG. 7) discussed earlier is caused, the second ADC 211B may prohibit driver coordinated control. The second ADC 211B may execute the control illustrated in FIG. 8 with driver coordinated control prohibited (coordinated steering command=1).

Figure 16:
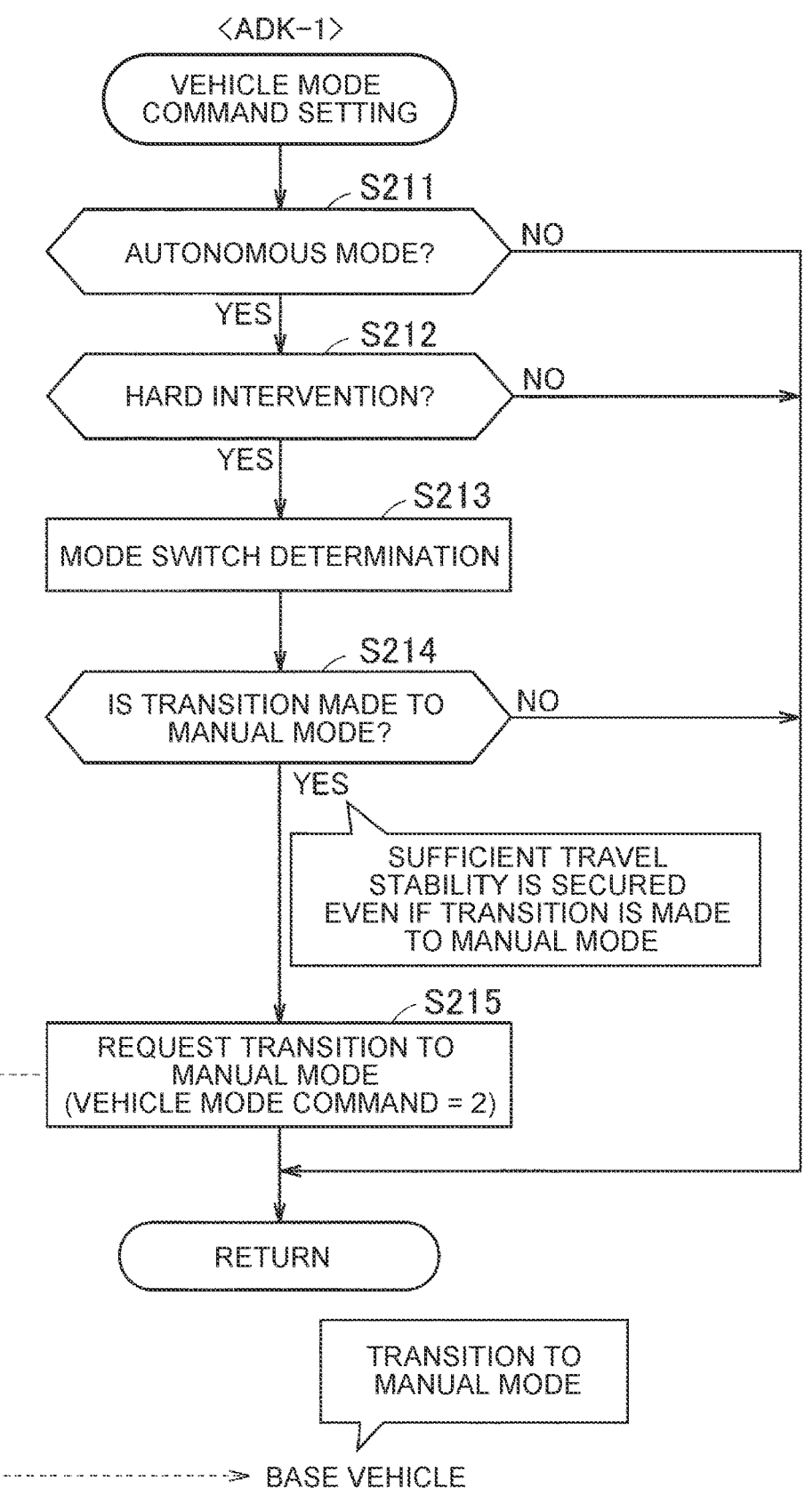
FIG. 16 is a flowchart illustrating vehicle mode command setting based on the driver intervention status set through the process illustrated in FIG. 14.

The first ADC 211A may determine the vehicle mode using the driver intervention status. For example, in S15 in FIG. 7, the first ADC 211A may set the value of the vehicle mode command using the driver intervention status. The vehicle mode command requests switching between the autonomous mode and the manual mode. FIG. 16 is a flowchart illustrating a process related to vehicle mode command setting executed by the first ADC 211A. The vehicle mode command is set to "0" (no request) at the timing when the series of processes illustrated in FIG. 16 is started.

With reference to FIG. 16, in S211, the first ADC 211A determines whether the present vehicle mode is the autonomous mode based on the vehicle mode status. When the present vehicle mode is the autonomous mode (YES in S211), in S212, the first ADC 211A determines whether the driver intervention status indicates hard intervention (2). When the driver intervention status indicates hard intervention (YES in S212), in S213, the first ADC 211A executes a determination as to whether sufficient travel stability is secured even if switching is made to the manual mode. When the driver intervention status indicates hard intervention, there is a possibility that the driver desires to drive manually. The first ADC 211A may confirm the status of the vehicle 1 based on at least one of the various API statuses and the environmental information acquired by the recognition sensor 212. In the subsequent S214, the first ADC 211A determines whether a transition is made from the autonomous mode to the manual mode based on the results of the determination in S213. Specifically, a transition is made to the manual mode when it is determined that sufficient travel stability is secured even if switching is made to the manual mode, and a transition is not made to the manual mode otherwise. For example, in S213, the first ADC 211A may determine that a transition is made to the manual mode when it is determined that there is no obstacle around the vehicle 1 and the vehicle speed is equal to or less than a predetermined criterion value.

When it is determined that a transition is made to the manual mode (YES in S214), in S215, the first ADC 211A sets the vehicle mode command to "2". Consequently, the ADK 200 requests the VP 100 to transition to the manual mode. Then, the base vehicle 120 switches the vehicle mode to the manual mode according to an instruction from the ADK 200. When NO is determined in S211, S212, or S214, the series of processes illustrated in FIG. 16 is ended without changing the vehicle mode command.

In the control illustrated in FIG. 16, the first ADC 211A (second control device) determines whether switching is made from the autonomous mode to the manual mode (S213 and S214) when driver intervention is classified into hard intervention (third category) in the autonomous mode. With such a configuration, the ADK 200 can easily make switching between the autonomous mode and the manual mode appropriately.

The embodiment and the various modifications discussed above may be implemented in any combination. The embodiment disclosed herein should be considered to be illustrative and not restrictive in all respects. The technical scope indicated by the present disclosure is set forth by the claims rather than by the above description of the embodiment, and is intended to include all modifications within the meaning and scope equivalent to those of the claims.

What is claimed is:

1. A vehicle comprising:

a vehicle platform configured to receive an instruction from an autonomous driving kit, wherein:

the vehicle platform includes a steering wheel to be operated by a driver of the vehicle, a steering motor configured to generate torque for varying an angle of a front wheel of the vehicle, and a first control device configured to control the steering motor;

the vehicle platform is configured to receive a front wheel steering angle instruction value requested by the autonomous driving kit during autonomous driving of the vehicle; and the first control device is configured to classify driver intervention to the steering wheel into one of a plurality of categories, and control the torque of the steering motor in consideration of a steering intention of the driver when a driver operation on the steering wheel is caused, during the autonomous driving of the vehicle, the vehicle further includes the autonomous driving kit, wherein:

the categories include:

a first category in which there is no operation of the steering wheel or a slight operation of the steering wheel, a second category in which an operation of the steering wheel is greater than an operation of the steering wheel in the first category, and a third category in which an operation of the steering wheel is greater than the operation of the steering wheel in the second category;

the vehicle platform is configured to transmit a result of classifying the driver intervention to the autonomous driving kit;

the autonomous driving kit includes a second control device configured to determine a command related to autonomous driving control using the result of classifying the driver intervention, the vehicle platform includes a base vehicle that includes the steering wheel, the steering motor, and the first control device, and a vehicle control interface box that includes a third control device configured to communicate with both the first control device and the second control device;

the first control device is configured to transmit vehicle information about the base vehicle to the third control device;

an application program interface signal defined by an application program interface is used for communication between the second control device and the third control device;

the application program interface signal includes:

(i) an application program interface command that indicates an instruction for the base vehicle, and (ii) an application program interface status that indicates a state of the base vehicle;

the third control device is configured to:

(a) convert the application program interface command from the second control device into a signal that is executable by the first control device, and transmit the converted signal to the first control device; and (b) acquire the application program interface status using the vehicle information from the first control device, and transmit the acquired application program interface status to the second control device.

2. The vehicle according to claim 1, wherein the categories include:

a first category in which there is no operation of the steering wheel or a slight operation of the steering wheel;

a second category in which an operation of the steering wheel is greater than an operation of the steering wheel in the first category; and a third category in which an operation of the steering wheel is greater than the operation of the steering wheel in the second category.

3. The vehicle according to claim 2, wherein:

the vehicle platform further includes a torque sensor configured to detect steering torque input from the driver of the vehicle to the steering wheel; and the first control device is configured to classify the driver intervention into one of the categories based on the steering torque.

4. The vehicle according to claim 1, wherein the first control device is configured to estimate the steering intention of the driver based on a result of classifying the driver intervention into one of the categories when the driver operation on the steering wheel is caused during the autonomous driving of the vehicle, and change a control mode for the torque of the steering motor according to the estimated steering intention of the driver.

5. The vehicle according to claim 1, wherein:

the first control device is configured to execute one of instruction value following control, in which the angle of the front wheel is caused to follow the front wheel steering angle instruction value from the autonomous driving kit, and driver coordinated control, in which the torque of the steering motor is controlled in consideration of the steering intention of the driver, during the autonomous driving of the vehicle; and the first control device is configured to give priority to followability to the front wheel steering angle instruction value over coordination with the driver of the vehicle during execution of the instruction value following control, and give priority to the coordination with the driver of the vehicle over the followability to the front wheel steering angle instruction value, during execution of the driver coordinated control.

6. The vehicle according to claim 1, wherein the vehicle platform is configured such that switching between a coordination permitted state and a coordination prohibited state is made according to the instruction from the autonomous driving kit, the coordination permitted state being a state in which coordinated steering with the driver is permitted, the coordination prohibited state being a state in which the coordinated steering with the driver is prohibited.

7. The vehicle according to claim 1, wherein:

the command related to the autonomous driving control includes a coordinated steering command that provides an instruction as to which of a coordination permitted state and a coordination prohibited state the vehicle platform is brought into, the coordination permitted state being a state in which coordinated steering with the driver is permitted, the coordination prohibited state being a state in which the coordinated steering with the driver is prohibited;

the second control device is configured to:

(i) determine whether to transition the vehicle platform from the coordination permitted state to the coordination prohibited state when the vehicle platform is in the coordination permitted state and the driver intervention is classified into the first category; and (ii) determine whether to transition the vehicle platform from the coordination prohibited state to the coordination permitted state when the vehicle platform is in the coordination prohibited state and the driver intervention is classified into the second category.

8. The vehicle according to claim 1, wherein:

the command related to the autonomous driving control includes a vehicle mode command that requests switching between an autonomous mode, in which the vehicle platform is under control by the autonomous driving kit, and a manual mode, in which the vehicle is under control by the driver; and the second control device is configured to determine whether switching is made from the autonomous mode to the manual mode when the driver intervention is classified into the third category in the autonomous mode.

\*    \*    \*    \*    \*